(12) United States Patent
Benjamin et al.

(10) Patent No.: US 7,283,904 B2
(45) Date of Patent: Oct. 16, 2007

(54) MULTI-SENSOR FUSION

(75) Inventors: Mitchell A. Benjamin, Renton, WA (US); Harris O. Hinnant, Seattle, WA (US); Thomas T. Shigeno, New Castle, WA (US); David N. Olmstead, Bainbridge Island, WA (US)

(73) Assignee: Airbiquity, Inc., Seattle, WA (US)

( * ) Notice: Subject to any disclaimer, the term of this patent is extended or adjusted under 35 U.S.C. 154(b) by 1109 days.

(21) Appl. No.: 09/981,660

(22) Filed: Oct. 17, 2001

(65) Prior Publication Data

US 2003/0073406 A1     Apr. 17, 2003

Related U.S. Application Data

(63) Continuation-in-part of application No. 09/837,563, filed on Apr. 17, 2001, now abandoned.

(60) Provisional application No. 60/198,068, filed on Apr. 17, 2000.

(51) Int. Cl.
*G06F 19/00*     (2006.01)

(52) U.S. Cl. .................. 701/117; 701/301; 340/425.5; 340/438

(58) Field of Classification Search ................. 701/117, 701/301; 340/425.5, 438
See application file for complete search history.

(56) References Cited

U.S. PATENT DOCUMENTS

| | | | |
|---|---|---|---|
| 5,530,758 A | 6/1996 | Marino, Jr. et al. | 380/49 |
| 5,732,074 A | 3/1998 | Spaur et al. | 370/313 |
| 5,809,437 A * | 9/1998 | Breed | 701/29 |
| 6,012,012 A * | 1/2000 | Fleck et al. | 701/117 |
| 6,080,063 A | 6/2000 | Khosla | 463/42 |
| 6,105,131 A | 8/2000 | Carroll | 713/155 |
| 6,122,514 A | 9/2000 | Spaur et al. | 455/448 |
| 6,150,931 A | 11/2000 | Yamagata et al. | 340/435 |
| 6,155,928 A | 12/2000 | Burdick | 463/46 |
| 6,160,493 A | 12/2000 | Smith | 340/902 |
| 6,161,071 A * | 12/2000 | Shuman et al. | 701/48 |

(Continued)

OTHER PUBLICATIONS

Jones, Willie D., Assistant Editor, "Keeping Cars Safe From Crashing," *IEEE Spectrum*, Sep. 2001, pp. 40-45.

(Continued)

*Primary Examiner*—Thomas Black
*Assistant Examiner*—Marie A Weiskopf
(74) *Attorney, Agent, or Firm*—Stolowitz Ford Cowger LLP

(57) ABSTRACT

Systems and methods are disclosed for establishing a mobile network in which each mobile unit, such as a car, becomes a node able to receive and transmit a wide variety of information, including for example, traffic conditions, vehicle mechanical/electrical status, interactive game playing information, streaming audio and video, email, and voice mail. In one aspect, multi-sensor fusion technology is used to determine the best value of a monitored variable, for example, the real time locations of each mobile unit, that may be communicated to others via the network. In addition, a new method of traffic control using real time traffic positioning and density data is disclosed. Further, methods and systems for enhancing driver safety are disclosed. In another aspect, the system may use a unique secure dynamic link allocation system to improve the information transfer from one node (mobile unit) to another and to other networks, such as the Internet.

29 Claims, 16 Drawing Sheets

U.S. PATENT DOCUMENTS

| | | | |
|---|---|---|---|
| 6,189,032 B1 | 2/2001 | Susaki et al. | 709/225 |
| 6,202,159 B1 | 3/2001 | Ghafir et al. | 713/201 |
| 6,263,268 B1 | 7/2001 | Nathanson | 701/29 |
| 6,330,499 B1 | 12/2001 | Chou et al. | 701/33 |
| 6,331,762 B1 | 12/2001 | Bertness | 320/134 |
| 6,339,736 B1 | 1/2002 | Moskowitz et al. | 701/29 |
| 6,356,820 B1 | 3/2002 | Hashimoto et al. | 701/23 |
| 6,405,132 B1 * | 6/2002 | Breed et al. | 701/301 |
| 6,742,037 B1 * | 5/2004 | Hall et al. | 709/228 |

OTHER PUBLICATIONS

"Technical Backgrounder: Cadillac's Night Vision System," Aug. 31, 1998, < page 4 http://www.autoweb.com.au/start_ 180/showall_ /id_HOL/doc_gmh9808312/article.html page 4 > (9 pages).

"Technical Innovations: Night Vision," printed Sep. 2001, < http://www.cadillac.com/tech/night_r.htm > (4 pages).

"Technical Innovations: Ultrasonic Rear Parking Assist," printed Sep. 2001, < http://www.cadillic.com/tech/ultrasonic_ r.htm > (1 page).

"Night Vision," printed Jul. 2001, http://autoscribes.org/nightvision.htm (15 pages).

"Cadillac's Imaj of the future," Global Viewpoints (May 2000), printed Sep. 2001, < http://www.sae.org/automag/globalview)05-00/03.htm > (4 pages).

"The 'Mechatronic' Car," printed Jul. 2001, < http://bmwworld.com/models/concepts/z22.htm > (2 pages).

"SmartCar 2001: Project Description," printed Jul. 2001, < http://www.cc.gatech.edu/classes/cs6751_ 98_ fall/projects/smartcar/part2_ v2/project-description.html > (3 pages).

"Microvision and Ford to Collaborate on Novel 'Heads-Up' Display For Automobiles," Source: Microvision Inc., May 24, 2001, < http://biz.yahoo.com/prnews/010524/sfth001.html > (2 pages).

"Sensors," Source: *Automotive Engineering International Online*, printed Jul. 2001, < http://www.sae.org/automag/sensors/index.htm > (17 pages).

"Some Head-Up Display References to Consider", printed Jul. 2001, < http://www.uiowa.edu/~ppc/hudrefs.html > (3 pages).

"Search Results", Source: IBM.com searching for 'automobile display', printed Jul. 2001, < http://wwwibm.com/search?v=11&lang=en&cc=us&q=automobile+display > (1 page).

"Reconfigurable Head-Up Display", Source: *Delphi Automotive Systems*, (2 pages).

"Internet Protocol: Connectionless Datagram Delivery," Chapter 7 in Book entitled *Internetworking with TCP/IP*, by Douglas E. Comer, published by Prentice-Hall, Inc. in 1995.

"Technical Trend of Multimedia Mobile and Broadband Wireless Access Systems," published in IEICE Trans. Communication, vol. E82-B, No. 12, Dec. 1999.

"Dicaf: A Distributed Architecture for Intelligent Transportation," by Noppanunt Utamaphethai, et al., IEEE, Mar. 1998, pp. 78-84, Internet site: http://www.ece.cmu.edu/~nau/docs/dicaf.pdf.

"Fault Diagnosis for Platooning Vehicles," printed form of PowerPoint slide show by Tunc Simsek, et al., Internet site: http://www.path.berkeley.edu/PATH/Research/presentations/tunc.pdf.

"National AHS Consortium Information Briefing for Lucent Technologies," printed form of PowerPoint slide show by Patrick Langley, Feb. 21, 1997, Internet site: http://www.monolith-mis.com/ahs/Scenarios/01/sld004.htm.

"Operation, Control, Hardware and Network Issues," published on the Internet by Kim Goltermann, Jul. 30, 2001.

"An Overview of Emerging Results in Networked Multi-Vehicle Systems," by Anouck Renée Girard, et al., Internet site: http://www.path.berkeley.edu/~anouck/papers/cdc3101.pdf.

"Platooning in FlyWay," published on the Internet by SwedeTrack System (Copyright 1997); printed from Internet site updated on Aug. 28, 2001.

"Radar Systems and Components for Intelligent Vehicles," by Dr. William Fleming, published on the Internet.

Raytheon Company Internet home page and datasheet entitled "RT Secure: Embedded Hard Real-Time Secure Operating System," Internet site: www.raytheon.com (Copyright 2000).

"Vehicle Platooning and Automated Highways," published by California PATH.

* cited by examiner

VEHICLE NODE PROCESS FLOW

MOBILE NODE: INCOMING MESSAGE PRIVILEGE CONTROL TABLE (PCT)

| CONTENT LABEL (CL) | SOURCE ADDRESS | SOURCE APPLICATION | DESTINATION APPLICATION | MESSAGE_TYPE | MESSAGE SIZE (KB) | SECURITY LEVEL (MIN) |
|---|---|---|---|---|---|---|
| 0 | (RESERVED) | | | | | |
| 1 | TELEPHONE CARRIER | TELEPHONE | TELEPHONE | INCOMING CALL | >10 | LOW |
| 2 | POLICE | STRANDED ASSIST | SECURITY | UNLOCK | <10 | HIGH |
| 3 | PSAP | 911 RESPONSE | LOCATION | LOCATION QUERY | <10 | MEDIUM |
| 4 | ISP | MESSAGING | EMAIL | EMAIL | 10-5000 | LOW |
| 5 | ISP | LOCAL NEWS | OPERATOR I/O | WEATHER REPORT | 50-200 | MEDIUM |
| 6 | ISP, VEHICLES | TRAFFIC NEWS | OPERATOR I/O | CONGESTION ALERT | 50-300 | LOW |
| 7 | HOME | MAPPING | LOCATION | LOCATION QUERY | <10 | MEDIUM |
| 8 | AUTO DEALER CENTER | MAINTENANCE | CONVENIENCE | SOFTWARE PATCH | 20-400 | MEDIUM |
| 9 | AUTO DEALER CENTER | MAINTENANCE | COMFORT | QUERY DIAGNOSTICS | 20-50 | MEDIUM |
| 10 | AUTO DEALER CENTER | MAINTENANCE | LOCATION | SOFTWARE PATCH | 20-100 | MEDIUM |
| 11 | AUTOMAKER ENGR'G. | ENGINE | ENGINE SETTINGS | ADJUST INTAKE | 150-200 | HIGH |
| 12 | AUTOMAKER ENGR'G. | SAFETY | ABS SETTINGS | ADJUST BRAKING | 150-200 | HIGH |
| 13 | AUTO MAINTENANCE | SERVICE NOTIFY | OPERATOR I/O | SERVICE DUE | 20-40 | MEDIUM |
| 14 | AUTO CLUB | SECURITY | SECURITY | UNLOCK | <10 | HIGH |
| 15 | AUTO CLUB | ROADSIDE ASSIST | LOCATION | LOCATION QUERY | <10 | MEDIUM |
| 16 | (ANY) | AUDIO DELIVERY | STEREO | DIGITAL AUDIO DATA | 500-10000 | LOW |
| 17 | STATE TROOPER | ROAD CLOSURES | NAVIGATION | ROAD CLOSURE NOTICE | 10-50 | LOW |
| 18 | ... | | | | | |

*Fig. 14A.*

VEHICLE NODE: OUTGOING MESSAGE PRIVILEGE CONTROL TABLE (PCT)

| CONTENT LABEL (CL) | SOURCE APPLICATION | DESTINATION ADDRESS | DESTINATION APPLICATION | MESSAGE_TYPE | MESSAGE SIZE (KB) | SECURITY LEVEL (MIN) |
|---|---|---|---|---|---|---|
| 0 | | | (RESERVED) | | | |
| ... | | | | | | |
| 3 | EMERGENCY | PSAP - 911 CALL CENTER | 911 RESPONSE | EMERGENCY DISTRESS | ANY | OFF |
| 4 | TEXT MESSAGING | ISP MAIL SERVER | MESSAGING | EMAIL | <5000 | LOW |
| 6 | TRAFFIC MONITOR | (LOCAL VEHICLES, TRAFFIC POLICE, MEDIA) | OPERATOR I/O, TRAFFIC NEWS | TRAFFIC FLOW DATA | <20 | MEDIUM |
| ... | | | | | | |
| 15 | ROADSIDE ASSIST | AUTO CLUB | CALL CENTER | NEED ROADSIDE HELP | 30-100 | MEDIUM |
| ... | | | | | | |

*Fig. 14B.*

AUTO CLUB CALL CENTER NODE: OUTGOING MESSAGE PRIVILEGE CONTROL TABLE (PCT)

| CONTENT LABEL (CL) | SOURCE APPLICATION | DESTINATION ADDRESS | DESTINATION APPLICATION | MESSAGE_TYPE | MESSAGE SIZE (KB) | SECURITY LEVEL (MIN) |
|---|---|---|---|---|---|---|
| 0 | | | (RESERVED) | | | |
| 14 | SECURITY | VEHICLE | SECURITY | UNLOCK | <10 | HIGH |
| 15 | ROADSIDE ASSIST | VEHICLE | LOCATION | LOCATION QUERY | <10 | MEDIUM |
| ... | | | | | | |

*FIG. 14C.*

MULTI-SENSOR FUSION

RELATED APPLICATIONS

This application is a continuation-in-part of, and claims priority from, prior U.S. application Ser. No. 09/837,563 filed Apr. 17, 2001 now abandoned which in turn claims priority from U.S. provisional application No. 60/198,068 filed Apr. 17, 2000.

COPYRIGHT NOTICE

© 2001 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

TECHNICAL FIELD

This application is in the field of data communications and, more specifically, is directed to systems, methods and apparatus using wireless communications to, from and between mobile units that form nodes in a communications web, optionally using a dynamic link allocation system that provides improved security, efficiency and reliability.

BACKGROUND OF THE INVENTION

Today there are many communication systems, often interlinked, that permit the transmission of information from one person or organization to another. Indeed, the information technologies form a vital and significant sector of the economy of most advanced nations and without such technologies it is generally agreed that business productivity, news and information flow and entertainment would be severely impaired. Much of the information flow is by wired connections, for example, through copper cable and increasingly via fiber optic cable, but this is often used in conjunction with wireless connections, for example, in wireless access by cell phone of an Internet website. Wireless Internet access generally requires that a connection be established between a wireless receiver and a transmitter from a server that in turn is typically in communication with a network of other servers, as in the case of the Internet, so that information flows to the cell phone through a wireless connection with a wired network. This type of mixed wired and wireless communication pathway or link is now widely accepted and used.

Often one of the major issues in any form of communication is privacy and security. To that end, most secure data communication methods are designed to preserve the confidentiality of data being transmitted over communication networks, such as telephone networks, the Internet, wireless data transmission systems, and other digital data transmission systems and networks. These methods of secure data transmission include data encryption and decryption algorithms that use long randomly-generated cipher keys. However, encryption of data and messages cannot ensure that the message sender is truly whom he or she holds himself or herself out to be. In other words, cryptography does not authenticate the sender.

For example, to use public key encryption (PKE), the intended recipient must first issue a public encryption key that a prospective sender can use to encrypt a message for delivery to the intended recipient. The message is decryptable only with a private encryption key (the complement of the public key) known only to the intended recipient. A public encryption key distributed over a public network is vulnerable to interception by an eavesdropper. Thus, a recipient of data encrypted using PKE cannot be certain of a sender's identity because an encrypted message can be generated by anyone who has obtained access to the public key.

Various methods are known for authentication of a sending computer. These methods typically employ digital signature algorithms or security certificates authenticated by trusted third parties.

Known encryption, digital signature, and certificate authentication methods are susceptible to playback, middleman, code book, cryptanalysis attacks through monitoring of network traffic associated with the sending and receiving computers or by impersonation of a trusted third party or certificate holder.

Some types of attacks on communications security affect the integrity of the communication rather than its confidentiality. For instance, denial-of-service attacks can disable a receiving node by flooding it with unauthorized messages. Integrity attacks are most harmful when the timely and accurate receipt of a secure communication is important.

U.S. Pat. No. 5,530,758 of Marino, Jr. et al. describes a system and method of secure communication between software applications running on two trusted nodes, which are coupled by an unsecure network link. A simple method of authenticating a sending node is also described. A trusted interface of each trusted node acts as a gateway for all messages sent from or received by applications running on the trusted node. The trusted interface applies security restrictions defined by an identity based access control table (IBAC table), which is predefined for each node by a security administrator. The IBAC table stored at a node lists addresses of trusted nodes to which the local applications are authorized to send messages and from which the local applications are authorized to receive messages. Secure communication is established between trusted nodes in response to a service requests made by the applications. After verifying that a service request designates a remote node listed in the IBAC table, the trusted interface initializes a secure communications channel in cooperation with security kernels of the trusted nodes. The initialization sequence includes an exchange of security certificates and communication security attribute information between the security kernels, which is then used by each node to authenticate the other and to establish a security rating for the channel. Following authentication, the security kernels of the trusted nodes exchange traffic encryption keys which are used for encryption of subsequent data transmitted over the channel.

A need exists for an improved method and system for secure data transmission that is designed to ensure the confidentiality, authenticity, integrity, and non-repudiation of message traffic. A need also exists for such a system that can be deployed in stages to achieve progressively better security as the need arises.

U.S. Pat. No. 6,122,514 to Spaur et al. describes methods of communication channel selection, taking into account the requirements of each application program intended to communicate over one or more available channels. According to the Spaur et al. patent, an application program is designed to provide its applications requirements either dynamically, as the application executes, or statically, at the time of application installation, to the "network channel selection apparatus 14." See column 5, lines 49 et seq. and FIG. 1. These "requirements" relate to cost factors, transfer rates, etc.

One problem with the approach taught by Spaur et al. is that every application program must be custom designed, or modified, to interact with the network channel selection apparatus as described. This approach is cumbersome, expensive and violates the very essence of interoperability enabled by a layered approach such as the OSI model. The need remains for intelligent link management that is transparent to the application, so that standard "off the shelf" applications can be effectively deployed in the wireless environment. Similarly, at the network interface or link layer level, Spaur et al. teach a link controller/monitor connected to the network interface hardware (FIG. 1). The specification explains:

> "The network channel selection apparatus 14 also includes a link controller/monitor 50 that is operatively connected to the network interfaces 30 for receiving information therefrom and making requests thereto. In particular, the link controller/monitor takes responsibility for the control and status of the of the network channels 34a-34n. It maintains a status watch of each such channel by means of its communication with the network interfaces 30. The monitoring process is network channel dependent."

U.S. Pat. No. 6,122,514 at column 9, lines 35 et seq.

Consequently, it appears that the network interfaces also must be custom designed, or modified, to interact with the link controller/monitor 50 as described. This approach is cumbersome, expensive and violates the very essence of interoperability enabled by a layered approach such as the OSI model. The need remains for intelligent link management that is isolated from and transparent to link channels, so that standard "off the shelf" hardware and software components can be employed. Another limitation of the prior art is that a single communication or "session" is limited to a single communication link outbound, and optionally a second link inbound.

The identified need for improvements in communication efficiency is addressed in our co-pending application entitled "Secure Dynamic Allocation System for Mobile Data Communications, filed Apr. 17, 2001. Since aspects of the described allocation system may be used in conjunction with the present application relating to wireless communications, albeit that the described allocation systems are not the only useful ones, they are described in this application as well for ease of understanding and appreciation.

SUMMARY OF THE INVENTION

The invention is of a system, apparatus and methodology for communicating information, especially fusion data, between mobile units. In accordance with the system, a plurality of vehicles, such as cars, trucks, boats, aircraft are each equipped with an onboard multi-sensor, processor and communications apparatus to become mobile units in the communications network. The multi-sensor serves several functions, including diagnostic functions relating to mechanical and electrical systems of the mobile unit, and monitoring of the surrounding environment (weather, traffic conditions, proximity of other mobile units, and the like), and each mobile unit communicates through a wireless receiver and transmitter. Each or some mobile units may also be equipped with a secure dynamic link allocation system for mobile data communication, as described in our co-pending application, and as also described below in pertinent part. The system of the invention permits each mobile unit to communicate information to other mobile units preferably through a link allocation system, whether secure or not. This information may further be communicated to a server in wireless or wired connection to other servers, such as the Internet, or to a telephone or cellular network for communicating with a specific party (call center). In effect, in accordance with the invention, each mobile unit becomes a node in a wireless network that may communicate with other nodes of the network and also other networks, such as the Internet, either directly or via other nodes. In so doing, the invention provides, for the first time, a means of communicating information between a mobile unit, through a communication pathway that may include other mobile units that receive and transmit the communication, to and from another party.

In one aspect, the system includes the use of multi-sensor data fusion technology to establish in real time the unique locations of each of at least some of the mobile units in closest proximity to a mobile unit that is communicating information, or about to communicate information. This facilitates the selection or allocation of the best communication pathway or link.

The system of the invention may be used to transfer almost any kind of information. Thus, the information may include information from the multi-sensors, such as diagnostic information about the mechanical or electrical condition of a mechanical unit, or about its surrounding environment, for example, traffic conditions, weather conditions, roadway obstructions, accidents on a roadway, and the like or other information from other sources. Thus, the information may also include streaming audio and/or video, for example, occupants of a vehicle may receive a broadcast of entertainment programming, or may participate in an interactive electronic game with a plurality of other players, each located in other mobile units, or operating from consoles connected to servers in communication with the mobile network.

The system also provides an improved form of traffic control. Since the system of the invention, in one embodiment, uses multi-sensor fusion to establish in real time the location of each of a plurality of mobile units, and also establishes the distances between these units, traffic speed and density may be determined. Based on this determination, traffic control centers may implement strategies for reducing traffic congestion. For example, the information may be used to control the timing of traffic lights at intersections, and to divert drivers from particular routes to others, to avoid particularly congested areas. Weather information collected at the multi-sensors of each mobile unit may also be factored into a traffic control strategy.

The system of the invention provides enhanced security and safety for persons in mobile units equipped with the invention. Since multi-sensor fusion technology detects the proximity of surrounding mobile units or vehicles, the mobile unit onboard processor may be programmed to analyze this information and provide a warning to the driver, for example, by an alarm or heads up or other display. In addition, information relating to collision avoidance may be communicated to a controller that automatically controls the mobile unit to take evasive action to avoid a potential accident situation. Further, potential collision related information obtained from sensors may be checked against appropriate information from surrounding mobile units to verify risk of a collision or to identify sensors that may be malfunctioning.

The system of the invention may utilize methods for layered, secure data communications with a mobile unit over a variety of different communication links, such as in-band signaling, SMS, CDPD etc, as disclosed in our co-pending application, although such secure communications may not be necessary in all instances. Thus, for example, a privilege control table may determine permitted classes of messages, each class corresponding to a predetermined combination of a selected sending application, a selected destination application and a selected message type. Content labeling is used to further manage communications without reading the payload of the message. The invention adds additional layers of security by varying content labels based on secure session key exchange seeded algorithms. The system may also include isolating the application program by providing a protocol manager for exclusive receipt of a communication service request from the application program; the protocol manager implementing a plurality of different message protocols for establishing corresponding virtual socket connections with various application programs. Another aspect of the allocation system may include link choose logic for effecting loosely-coupled, network loop communications to enable broadband delivery to a mobile unit, and can include parallel transmission of segmented messages over plural communication links.

A security manager may be implemented in computer software, firmware, or hardware for use in conjunction with a data communication device. The security manager is useful for securely transmitting data from an application software program to another computer or software program and for verifying the authenticity and integrity of data addressed to the application software program.

The security manager may include multiple subsystems that are applied cumulatively to data being transmitted between the data communication device and a remote device. The security subsystems can include encryption, content labeling, source identification, and data integrity subsystems and any combination thereof. The security manager is adapted to manage and apply security subsystems in a modular environment. Because security subsystems are implemented as independent modules of the security manager system, they can be deployed when developed and then revised as needed during the life of the data communication device. Modular security subsystems may also allow device manufacturers and network operators to implement security improvements in progressive phases to spread the cost and complexity over time. With enough security, the system can provide a foundation for users to establish and protect their personal digital identity.

The security manager may initiate an authentication sequence and public key exchange between the data communication client and a data server. The authentication sequence and key exchange occurs over a first data communication link, which is preferably an in-band signaling channel operating over a voice channel of wireless communication device such as a cellular telephone. In-band signaling is preferred because the telephone networks over which it can be used are more widely available than other communication links (e.g., Bluetooth™, satellite broadband, infrared, CDPD, etc.). Furthermore, encryption key exchange is critical to operation of the security manager, and is best accomplished through the use of a proprietary protocol such as in-band signaling, rather than a widely recognized protocol such as TCP/IP or Bluetooth™. After the key exchange is complete, the security manager is enabled to encrypt outgoing messages and decrypt incoming messages.

A second data communication link, preferably different from the first data communication link, may be utilized for transferring encrypted message payload. The message payload may also be spread over several links, which may include the first data communication link and others. More specifically, a message is divided into multiple packets, but the packets are then allocated or "spread" over two or more different communication links. This strategy enhances the difficulty of an unauthorized third party intercepting and reconstructing the message.

Realizing another layer of security, allowable inbound and outbound messages are defined in a Privilege Control Table (PCT) that is stored in non-volatile read/write memory accessible by the security manager. A content label included in each transmission received by the security manager is verified against the PCT to authenticate the sender and message type before delivering the payload of the transmission to an authorized recipient user application. For each user application to which the security manager delivers message, the PCT includes entries for authorized combinations of source application, message code, message size, and security rating. Each entry combination is listed in the PCT along with a corresponding content label. Such content labels need not be static, however. A further aspect of the allocation system's security provides for re-ordering or reassigning content labels to PCT entries, again providing another layer of security. Reordering or reassigning content labels is managed by predetermined algorithms implemented in both the sending and receiving nodes that utilize a shared private key generated by each of the nodes following a public key exchange.

The security manager, the application software program, and the data communication device may all be implemented on a computer system, such as a personal computer, cellular telephone, personal data assistant, handheld wireless communication device, or other devices including a digital computing device. However, the components may also be distributed over different devices with secure interconnections, which, when viewed as a unit comprise a node of the secure system.

The computer system or other communication device has access to one or more communication network links (typically unsecured) or other digital data or audio data communication links for communicating with remote devices or systems. A link manager protocol is operable on the computer system for choosing the appropriate communication network link based on cost, priority, security, and availability of the various types of network links and the cost, priority, and security required by the application or the security manager. The link manager can also be configured to spread messages over several network links in accordance with cost, priority, and security requirements of the application, and to balance loads across the available links.

New capabilities are presented in the context of a more broadly defined, loosely coupled network, in which initial communications, e.g., between a first mobile unit and possibly via other mobile units in a communications pathway to a first server, begin a process that results in a separate but related broadcast communication from a second server to the first mobile unit or via another mobile unit in a pathway that communicates with the first mobile unit, thereby completing a loop topology. In one embodiment, the loop topology established includes non-uniform loop segments using different transmission methodologies. In this arrangement, a broadband transmitter, e.g., a satellite-borne or road-side transmitter, can form the final link in such a communication loop that begins with another link, such as an in-band signaling link. The broadband link is adapted for delivery of data at high bandwidths that the mobile unit is capable of receiving but not transmitting. This loosely coupled networking method can be used for a mobile unit to receive, for example, video content or the like. This approach can also be used to bypass (actually pass through) the usual wireless voice services so that they unwittingly (and without surcharge) provide a pathway for initiating a link in the broadband network for delivery of data to the mobile unit.

Additional aspects and advantages of this invention will be apparent from the following detailed description of preferred embodiments thereof, which proceeds with reference to the accompanying drawings.

BRIEF DESCRIPTION OF THE DRAWINGS

Certain aspects of the invention may be more readily appreciated with reference to the accompanying illustrations which do not limit the scope of the invention but represent schematically examples of certain aspects of the invention.

FIGS. 14A, 14B, and 14C are examples of Privilege Control Tables (PCTs) in accordance with the present invention for implementing a content labeling and verification process of the secure dynamic link allocation system of FIG. 6 as referenced in FIGS. 7A, 7B, 7C, 8, and 11.

DETAILED DESCRIPTION OF PREFERRED EMBODIMENTS

In the specification and claims, the term "multi-sensor fusion" means the determination of the best value of a variable through the mathematical analysis of input data from two or more sensors measuring data relating to the variable; and also means the comparing and correlating of data from a multiplicity of sensors to obtain more complete information. For example, in order to determine a distance between two vehicles, each vehicle may be equipped with a variety of sensors, for example, radar, infrared, and other sensors for monitoring a distance between the vehicles. Depending upon environmental and other conditions, distance readings from these sensors may not be completely identical, and data fusion technology is used to compare, correlate and analyze the inputs from each of the different types of sensors to determine the best value of the distance between the vehicles. In general, the use of multi-sensor (data) fusion results in a better prediction (i.e., higher probability that it is precise and accurate) of the value of a variable at a particular time, than the use of a single sensor, that may be affected by a variety of factors leading to inaccuracy. Thus, multi-sensor fusion provides a smaller variation between the actual or true value of a variable and the value as measured by two or more sensors.

Figure 1:
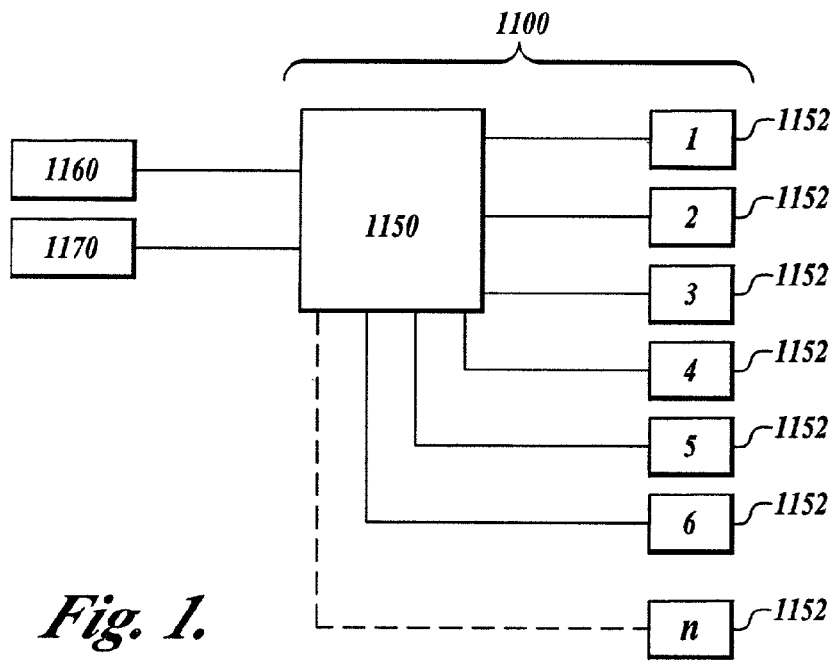
FIG. 1 is a schematic diagram illustrating, in block format, multiple sensors in communication with an onboard processor, and other equipment in accordance with an embodiment of the invention.

FIG. 1 illustrates a multi-sensor unit, in accordance with the invention in block form. The unit includes a multi-sensor 1100, that includes an onboard central processing unit 1150 receiving input from a multiplicity of sensors 1152 numbered 1, 2, . . . n, as shown. As many sensors as necessary may be used, to enable monitoring of the desired range of variables by at least two sensors to permit data fusion. Further, the multi-sensor unit console 1100 may be in communication with another onboard unit 1160, that may provide other information inputs or require, for example, an electronic game console, an onboard computer, a video display unit, an audio playback unit, and the like for communicating information to the processor and for receiving information therefrom. Further, the processor 1150 and optionally the onboard unit 1160 is in communication with a receiver transmitter 1170.

In accordance with the invention, the onboard processor 1150 receives input from sensors 1152, and analyzes these inputs to determine variables relating to the condition of the vehicle, its environment, and any other parameter that may be monitored. Information from certain sensors may relate to the same variable, for example, several sensors may be measuring a variable relating to a distance or speed of the unit. The onboard processor 1150 uses statistical techniques to analyze and correlate input information regarding a particular variable, to determine the best value of that variable. Thus, the onboard processor utilizes multi-sensor data fusion techniques to obtain a better estimate of a particular variable at a particular time than might be possible using only a single sensing technique to determine the value of that variable.

In accordance with the invention, these multi-sensors may perform a variety of monitoring and detecting functions, relating to both the status and condition of the vehicle as well as conditions in the environment surrounding a mobile unit. Sensed information may be interpreted and presented to the driver of the vehicle in the form of a "heads-up" windshield display, audio cues, or other kinds of feedback that would apprise the driver of the sensed conditions. Environmental sensors may include radar, proximity detectors, forward-looking infrared, backward-looking infrared, vehicle mechanical and electrical monitors (speed, braking, fuel level, oil pressure, etc.), GPS, directional compass, inertial navigation sensors, and any other electronic, optical or other sensors useful in gathering data about the mobile unit's condition and the environment in which it is operating. As discussed above, the inputs received from the various sensors are processed by an onboard computer, using data fusion employing any one or more of several techniques, for example, pattern recognition and comparison techniques as well as any other algorithms, to provide an integrated feedback recognizable to the driver regarding sensed conditions. In accordance with the invention, information supplied may be utilized to avoid collisions, traffic jams, and other driving hazards.

In the specification and claims, the term "mobile unit" means a vehicle that is either moving or capable of motion, such as a car, truck, aircraft, watercraft and the like that is equipped with a multi-sensor, so that it is thereby enabled to communicate with other similarly equipped vehicles. The term "vehicle" means a vehicle that may not be equipped with a multi-sensor, in accordance with the invention.

In the specification and claims, the term "environment surrounding a mobile unit" means the surrounding physical environment, including the proximity of other vehicles or mobile units, weather conditions, road conditions, detected accident sites, and the like.

In the specification and claims, the term "diagnostic information" means information regarding the status of a mobile unit, for example, oil pressure, fuel level, speed, condition of brakes, condition of any electrical and mechanical system of the vehicle that is being monitored, any detected condition requiring repair, and the like.

In accordance with the invention, there is provided a wireless network system, through which information is transferred from one node to another according to a communication pathway selection criterion and according to a secure or other dynamic link allocation system, in which each of the nodes is a mobile unit equipped with the wireless communications linkage capability of the invention. The wireless network may, at various nodes, be in communication with stationary servers that are in turn in wired or other communication with global computer networks, such as the Internet, or another communication system, such as a telephone or cellular network. Accordingly, the wireless system of the invention creates a wireless network that is potentially in communication with any available and useful wired or cellular network that is selected.

In another aspect of the invention, multi-sensor input data may be integrated with other data inputs from other sources regarding the environment that the mobile unit is traversing, for example, stationary environmental features such as road conditions, terrain, buildings, trees, crosswalks, construction zones, and the like. This other input data may be stored locally onboard the mobile unit, or may be uploaded from a centralized or distributed database accessible via a wireless data connection using cellular technology or broadband transmitters, and the like. The other input information may be used in conjunction with, or in data fusion with multi-sensor data, to navigate the mobile unit more effectively, and to avoid hazardous situations.

A further aspect of the invention relates to the integration of information regarding the status, position, velocity, and other critical conditions of nearby mobile units. These signals may originate from these mobile units, or may be received from a remote control center, such as a cellular base station or traffic control center. Integration of sensory data, stationary environmental data, and collaborative vehicle feedback significantly enhances a driver's overall situational awareness, thereby resulting in a safer driving experience.

In a farther aspect, information may be exchanged in real time with other mobile units to facilitate, for example, the playing of interactive games between participating occupants of two or more mobile units. Thus, each participant may have a game console in communication with its onboard multi-sensor processing unit which is in turn able to broadcast substantially simultaneously game information to a plurality of game participants in other mobile units.

Figure 2:
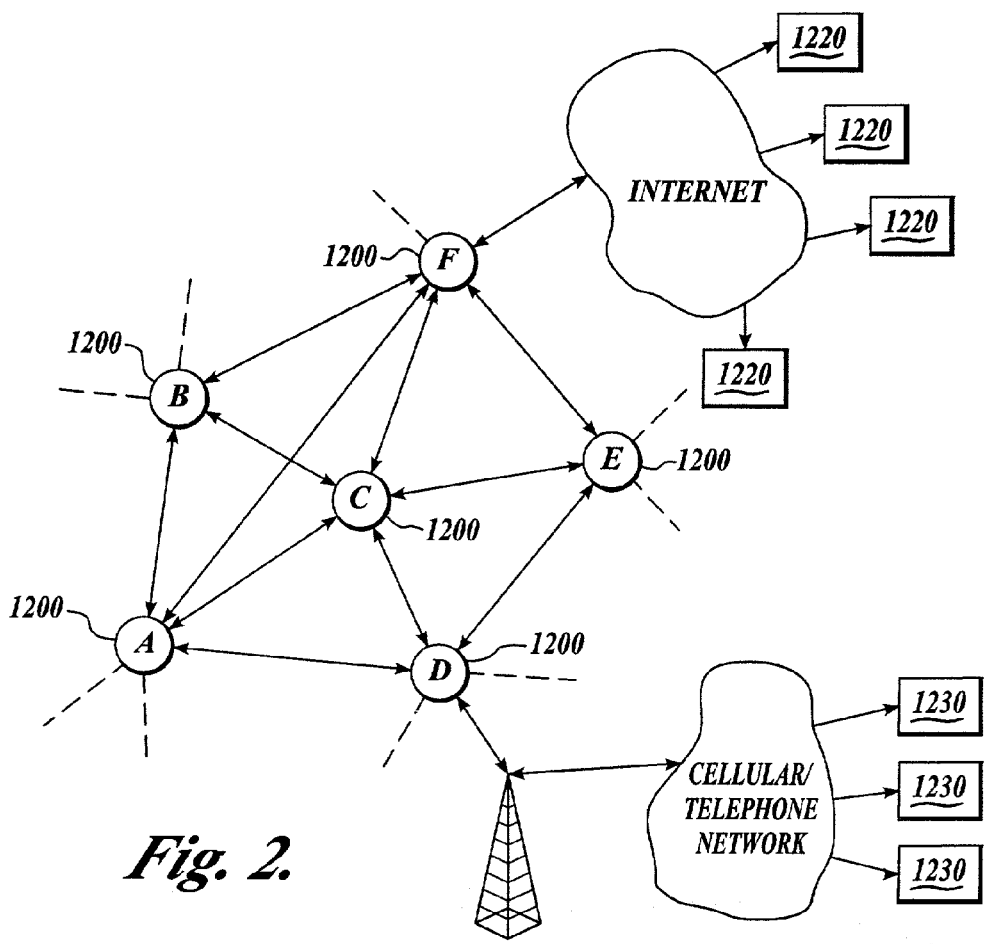
FIG. 2 is a schematic diagram illustrating an overview of an embodiment of the mobile network of the invention.

FIG. 2 is a schematic diagram showing a wireless network of mobile units 1200 at nodes of the network, with at least one of the mobile units in communication with the Internet and another in communication with a cellular network. As shown in FIG. 1, each of the mobile units 1200 of the network is either in communication with another unit, or potentially in such communication. At least some of the units 1200 are in communication with the Internet, which provides further possibilities for communication with servers of individual users 1220, that are connected to the Internet. Other mobile units are in communication with a cellular or telephone network, via a telecommunications tower 1300, and the telephone or cellular network may direct communications to specific individuals, corporations, or organizations 1230, as required.

In accordance with the invention, a specific communications pathway or link is selected for communication from any one of the mobile units 1200 to another or the Internet, for example. Thus, if mobile unit A desires to communicate with a fast food restaurant, for example, to place an order before arriving, then order information from mobile unit A may be communicated through or via mobile units C, and F and thence through the Internet; or alternatively via mobile unit B, then F and thence through the Internet. Other pathways are also possible and readily ascertainable, from inspection of FIG. 2. In accordance with the invention, the most efficient pathway is selected based on predetermined criteria, such as for example, proximity of the other mobile units 1200 to mobile unit A, and security or integrity of the link as discussed below.

Figure 3:
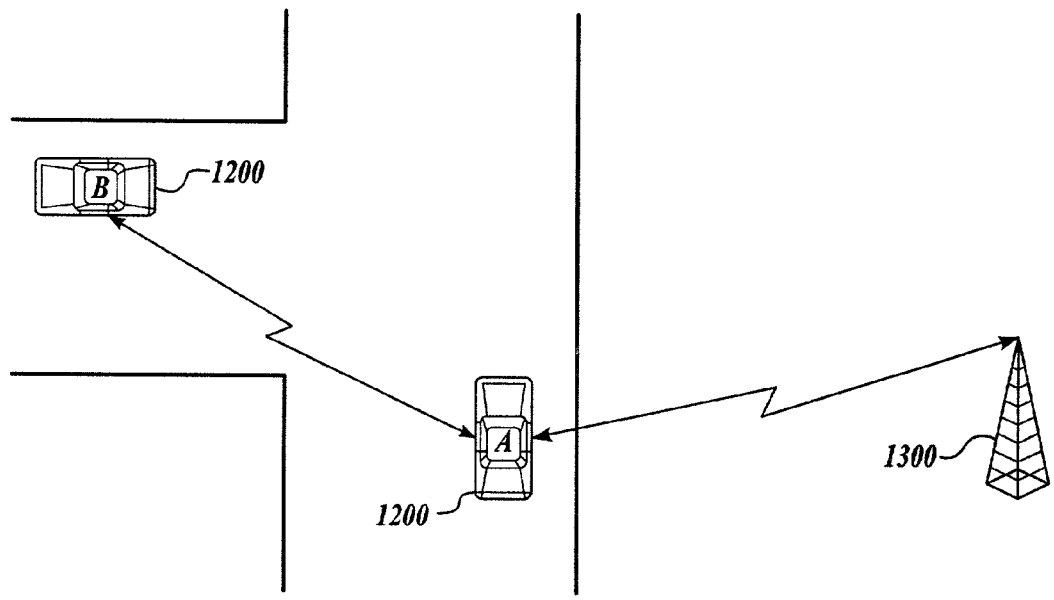
FIG. 3 is a schematic diagram showing a possible communication path from a mobile unit, via another, to a communications tower.
Figure 4:
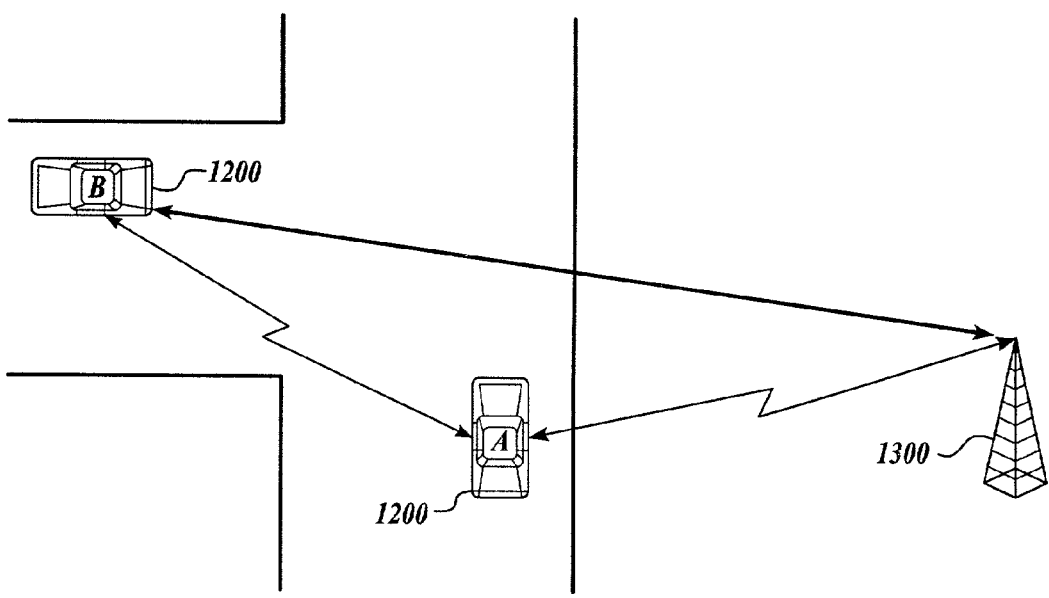
FIG. 4 is a schematic diagram illustrating another possible communications pathway.

As shown in FIGS. 3 and 4, communication from a communications tower 1300 to mobile unit 1200 B may be effected by a communications pathway that includes first communicating the information to mobile unit 1200 A, and thence transferring the communication to mobile unit 1200 B, based on a predetermination of the best communications signal route. Communications may also take place as illustrated in FIG. 3, which shows both direct communication between the communications tower 1300 and mobile unit 1200 B as well as communication via mobile unit 1200 A.

Thus, the invention is not limited to a particular communications pathway, but is able to dynamically select a pathway based on communications conditions and predetermined criteria.

Figure 5:
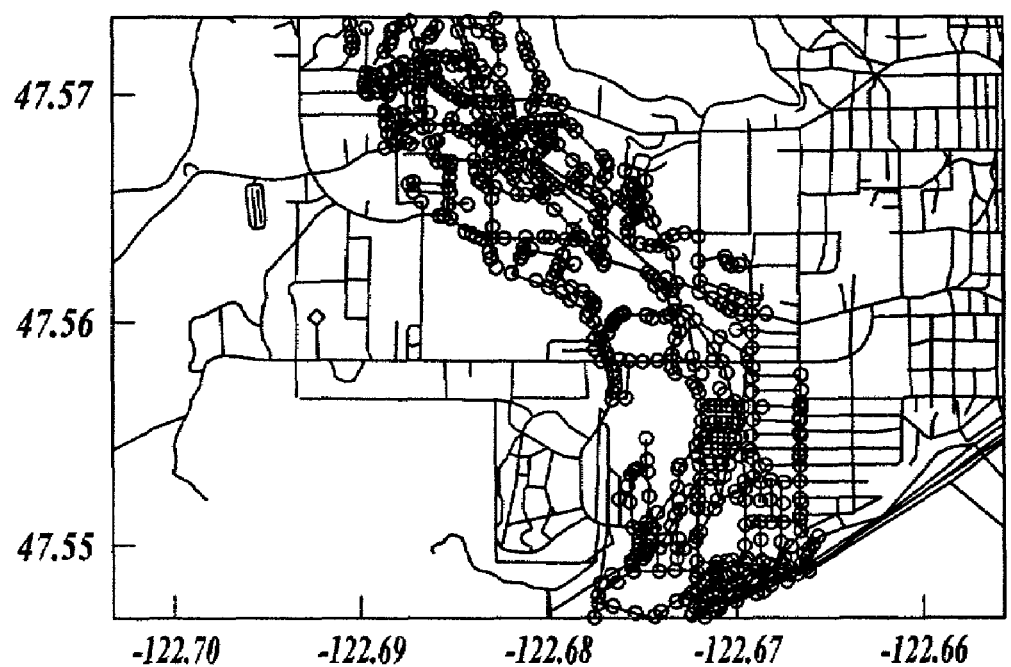
FIG. 5 is a schematic diagram of a map showing positions of mobile units in real time, from multi-sensor fusion technology.

FIG. 5 is a schematic illustration, depicting a map of a particular geographic location, with each circle 1200 representing a mobile unit travelling along a specific roadway. Such maps may be generated from multi-sensor fusion, including for example, information from global positioning satellite data, wheel speed rate, vehicular inertial measurements, etc. Thus, in accordance with the invention, multi-sensor fusion positioning data of mobile units may be transmitted directly to a central location, such as a traffic control center, or the mobile units may each automatically forward its multi-fusion determined location to the center. Regardless of technique used, the traffic control center will have access to mobile unit location and distance between mobile units, based on the fusion positioning data. Further, the data may be analyzed over predetermined time segments, to predict the speed of traffic flow, and even the speed of individual mobile units. At the traffic control center, based on the information regarding mobile unit traffic density, speed, and distance between units, valuable traffic control information may be developed and used to control traffic flow. For example, the traffic center may transmit information to particular mobile units advising alternative routes to avoid traffic congestion. Further, the traffic control center may have the capability to modify the timing of traffic lights to ease congestion, or may take any other prudent control action. Monitoring of traffic patterns over a period of time may also lead to better planning of roadways that more closely match actual traffic patterns.

In one aspect, the invention provides collision avoidance methodologies. For example, each of the mobile units may be equipped with a number of sensors each determining the distance between it and surrounding mobile units (radar, infrared, etc.). Through multi-sensor fusion, mobile unit A, for example, may determine that the distance between it and mobile unit B is x feet. Mobile unit B, also equipped with multi-sensor fusion, may determine that the distance between it and mobile unit A is y feet. However, since the onboard processors of mobile units A and B are in communication, and can each send and receive data regarding the distance between the two mobile units, the information from mobile unit B can be used in conjunction with other input data at mobile unit A, to develop a better estimate of the distance. Likewise, the distance determined from the multi-sensor fusion at mobile unit B, can be used in conjunction with the distance as calculated at mobile unit A in data fusion. This exchange of collision avoidance related information, typically, position, speed, direction of motion, etc., can either confirm that information at units A and B are in agreement, or it can assist in determining whether any sensor of units A or B is malfunctioning, and if its input should be disregarded. The information generated provides better data regarding the probability or risk of a collision, and the need for avoidance measures, such as a warning to the drivers, which might be effected through a heads-up display, audible warning, or any other useful means. This aspect of the invention serves, effectively, a three fold purpose: (1) using all information to determine by fusion a best value of the location of a mobile unit in time and space, (2) defining the uncertainty in the location, and (3) analyzing available information relating to collision avoidance from a plurality of mobile units in order to provide the driver with succinct information that increases vehicle safety.

In accordance with the invention, the multi-sensor fusion network also permits the transmission of TCP/IP or other internet protocol packet data. Desirably, at least one of the mobile units of a network is in wireless communication with the Internet, via a call center, satellite link, or any other means to act as a portal for other mobile units in the network. This kind of system enables occupants of mobile units to send and receive email, access web sites on the Internet, receive streaming audio and video, and indeed perform any other functions that can be performed using the Internet such as paying bills, reviewing stock prices and quotes, purchasing and selling stocks and bonds, conduct purchases from e-retailers, access (as authorized) office computers to perform functions such as preparing documents, amending documents, and the like.

In another aspect, the invention provides an improved vehicle safety environment, by fusion of information available from onboard multi-sensors of the mobile units operating in the network. Thus, information from a particular mobile unit, may be fused with information transmitted and received from a plurality of other mobile units, and fused using algorithms well known for that purpose (such as Kalman filters, least squares tracking filters, and other statistical techniques) to produce tracking information that may be analyzed by estimation techniques. This tracking information may be provided to the driver of a mobile unit, by visual display, audible alarm or any other means thereby improving safety, and may also be supplied to traffic control authorities.

In the communication of information from one mobile unit to another, to call centers, telephone networks, or to the Internet, it is frequently desirable to have a secure link. While such secure link may be desirable, it is not essential or necessary for the operation of the invention. Nonetheless, we describe herein a secure dynamic link allocation system that is useful in the context of the invention that can use other even non-secure links.

Figure 6:
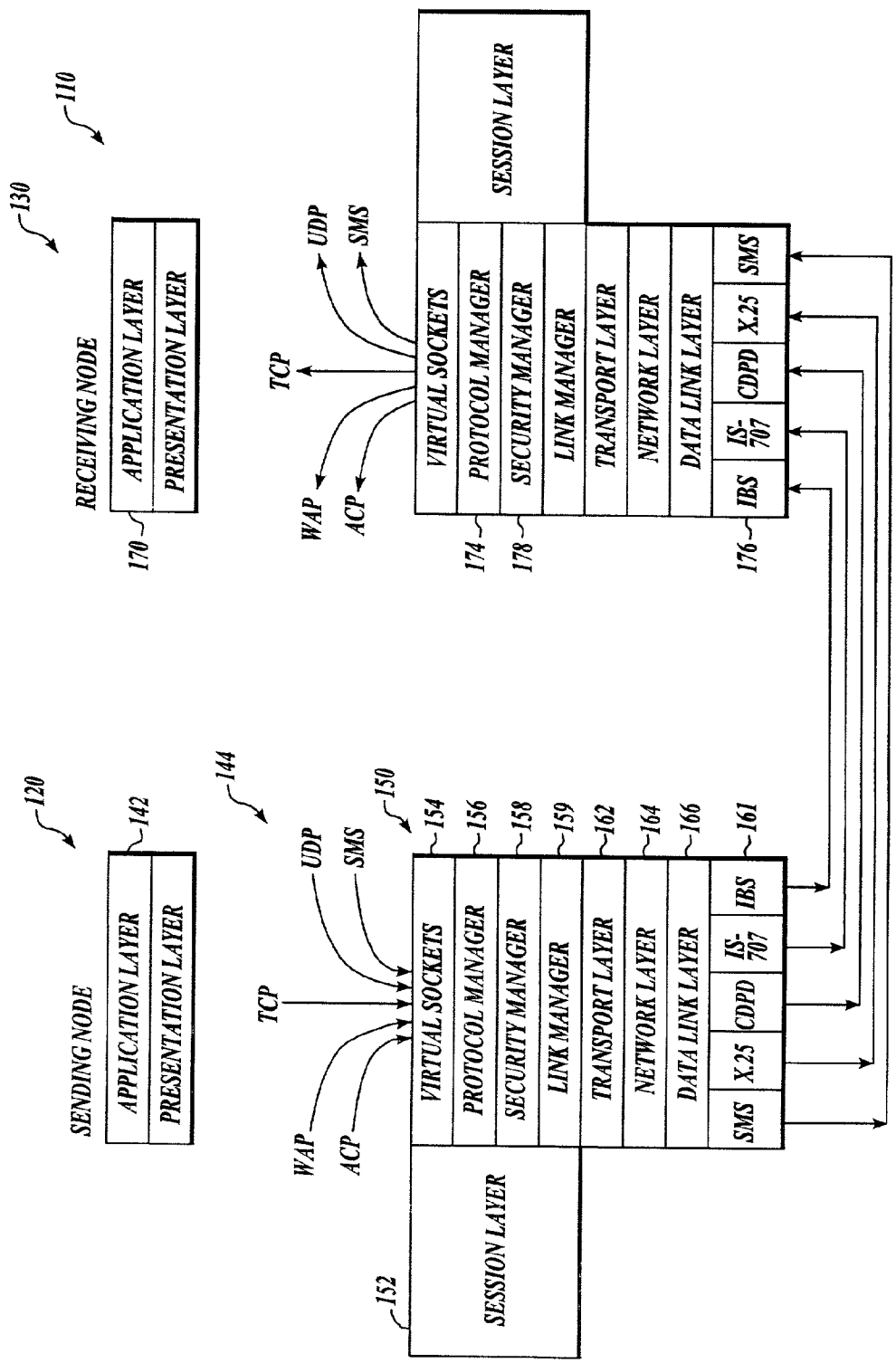
FIG. 6 is an interconnection diagram showing an overview of a system software program implemented in a sending node and a receiving node to form a secure dynamic link allocation system for mobile data communication in accordance with the present invention.

The remaining description that follows here below may also be found in our co-pending application of Apr. 17, 2001 entitled "Secure Dynamic Link Allocation System for Mobile Data Communication" and relates more particularly to a protocol for selection of secure communications pathways or links between nodes of the mobile network and also between the nodes and other telecommunication systems, such as the Internet or a cellular system. FIG. 6 is an interconnection diagram showing a secure dynamic link allocation system 110 for mobile data communication (hereinafter "the secure communication system"), useful in the present invention. With reference to FIG. 6, a sending node 120 establishes communication with a receiving node 130. Sending node 120 and receiving node 130 can be implemented on any of a variety of hardware platforms using either widely available software or customized software. Sending node 120 and receiving node 130 include symmetric software components that are represented in FIG. 6 by the generic layers of the Open Systems Interconnect model ("OSI model"). Although FIG. 6 depicts transmission of message data from sending node to receiving node, communication can be either one-way or two-way in operation. One or more applications run on sending node 120 as represented by application layer 142. The applications generate messages for transmission using one of several widely available communication protocols 144, such as a ACP, WAP, TCP, UDP, SMS, and others.

A sending system software 150 is preferably implemented in a session layer 152, and includes a set of virtual sockets 154 corresponding to transport services typically provided by standard transport software implementing the communications protocols 144. Virtual sockets 154 are transparent to applications running in application layer 142 in that messages passed to virtual sockets 154 by the applications are handled as if virtual sockets 154 were operating as transport services. However, virtual sockets 154 handle messages differently from transport software associated with a particular link. Rather, virtual sockets 154 work in conjunction with a protocol manager 156 and a security manager 158, and a link manager 159 of sending system software 150 to isolate applications running in application layer 142 from various communications network transmission systems and links 161 accessed through standard networking software operating in the transport layer 162, the network layer 164, and/or the data link layer 166.

One or more receiving applications run in a receiving application layer 170 of receiving node 130. A receiving system software 174 is implemented on receiving node 130 similar to sending system software 150 operating on sending node 120. In accordance with the present invention, messages processed by sending system software 150 are received over one or more of various inbound links 176 at receiving node 130, then handled by receiving system software 174 to reassemble, verify security, and decode messages as needed. Receiving system software 174 then routes the processed messages to the appropriate applications running in receiving application layer 170. In this manner, communications system 110 can be implemented in a manner transparent to standard application software and data communication and networking software.

Security Manager 158 of sending system software 150 is adapted to establish a secure session with receiving node 130 through coordination with a receiving security manager 178. Sending security manager 158 can bypass security measures if secure transmission is not indicated by the type of message and if receiving node is not configured with receiving system software to establish secure communication.

The communications system 110 can be deployed to nodes that are already in service using a portable platform-neutral application language such as Java.

Figure 7A:
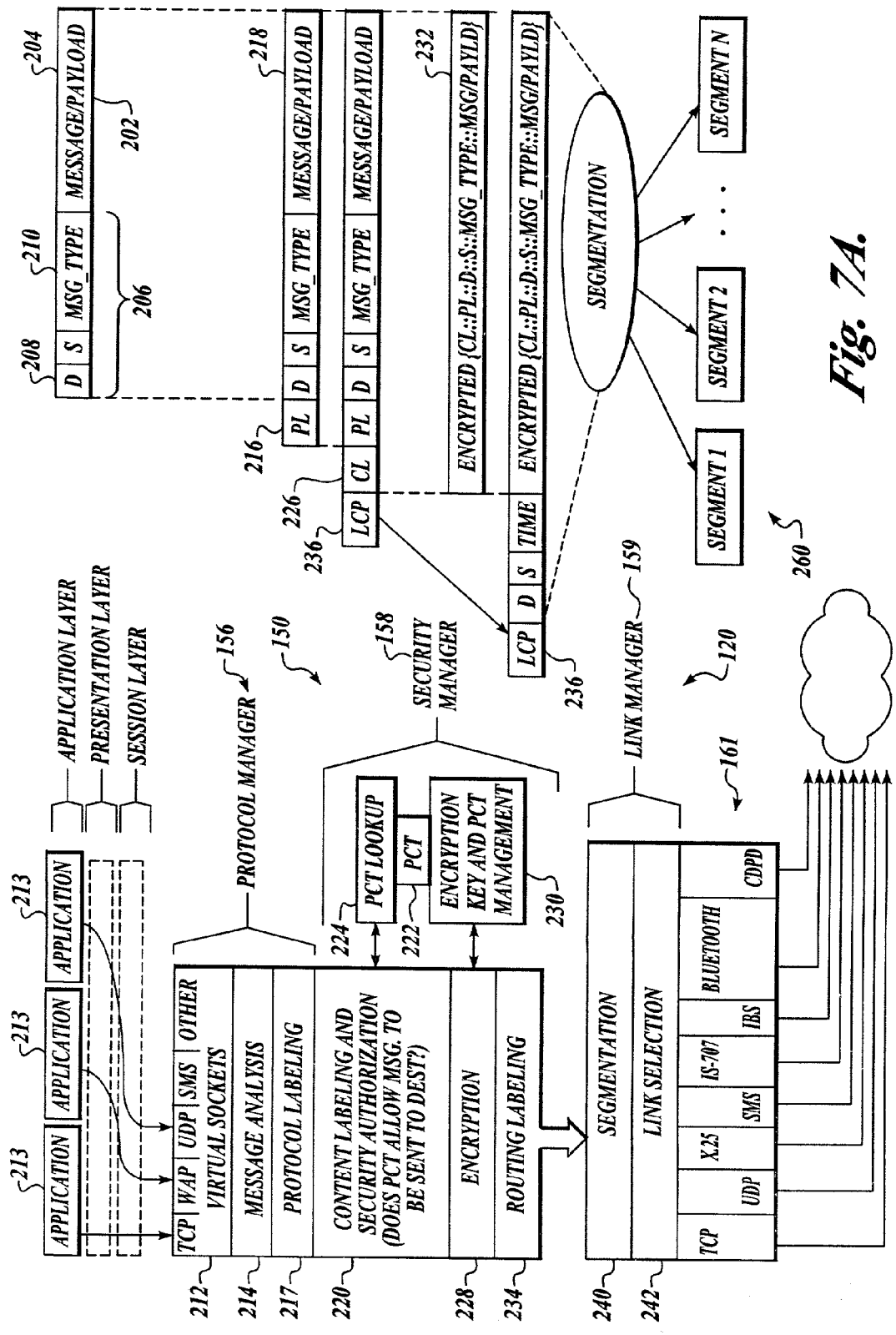
FIGS. 7A and 7B are schematic diagrams showing the software architecture of the system software of FIG. 6, in operation on the respective sending and receiving nodes and depicting a message generated at the sending node as processed by the system software at the sending node for transmission to the receiving node and, upon receipt at the receiving node, as processed for presentation to an application of the receiving node.

FIG. 7A is a schematic diagram showing software architecture of system software 150 operating on the descending node 120 of FIG. 6. In the right side of FIG. 7A, a message 202 directed to the receiving node 130 (FIG. 6) is shown being processed by the sending system software 150 before transmission to receiving node 130. With reference to FIG. 7A, message 202 includes a message payload 204 and a messager header 206 including a destination indicator 208 and a message-type field 210. Allowable message types are predefined for each application during the applications' development and certification in the context of the secure communication system.

Protocol manager 156 includes virtual sockets 212 corresponding to any of a variety of standard transport services supported by sending node 120, such as TCP, WAP, UDP, SMS, and other transport services. Virtual sockets 212 are adapted to receive messages from applications 213 running in application layer 142, then pass the messages to a message analysis module 214 of protocol manager 156. Message analysis module 214 extracts destination, source, and message-type information from message 202 and determines a message size of message 202 and the virtual socket 212 on which message 202 was received. A protocol label 216 is then prepended to message 202 by protocol labeling module 217 to indicate the virtual socket 212 on which message 202 was received. The resulting protocol labeled message 218 is then passed by protocol manager 156 to security manager 158 for security authorization and handling.

A content labeling and security authorization module 220 of security manager 158 accesses a privilege control table (PCT) 222 using a secure PCT lookup function 224 to identify an entry in PCT 222 corresponding to the sending application 213, destination 208, message type 210 and the size of message 202. If an entry is found in PCT 222, PCT lookup function 224 returns to content labeling and security authorization module 220 a "content label" (CL) 226 corresponding to the entry in the privilege control table. If an entry is not found in PCT 222, then PCT lookup function 224 returns a default content label, which indicates to content labeling and security authorization module 220 that message 202 is not authorized for transmission.

Protcol manager 156 and security manager 158 are also adapted to handle unsecure messages (not shown) generated by uncertified applications and which do not include message type information for lookup of content label information in PCT 222. If sending node 120 is configured to allow unsecure applications to send outgoing messages, then protocol manager 156 bypasses security manager 158 and presents link manager with an unsecure message for transmission on an appropriate link 161 of sending node 120.

In secure mode, the protocol label message 218 is prepended with content label 226 before encryption by an encryption module 228 of security manager 158. Encryption module 228 uses encryption keys generated by an encryption key and PCT management module 230, which is described in greater detail below with reference to FIGS. 11-13. An encrypted content labeled message 232 is generated by encryption module 228 and passed to a routing labeling module 234 of security manager, which prepends destination, source, time, and link choose parameters (LCP) 236 to encrypted content labeling message 232.

Alternatively, LCP, destination, source, time, and other message routing and security related information can be passed directly to link manager 159, either as a header to encrypted content labeled message 232 or in parallel with the transfer of encrypted content labeled message 232.

Upon receipt of encrypted content labeled message 232, a segmentation module 240 of link manager can optionally segment the encryped message into one or more message segments 260. A link selection module 240 identifies available links 161 and chooses one or more appropriate links based on link choose parameters 236 and other attributes of the message 232. Link manager 159 then distributes message segments 262 to the selected links in accordance with the link selection methodology described below.

Figure 7B:
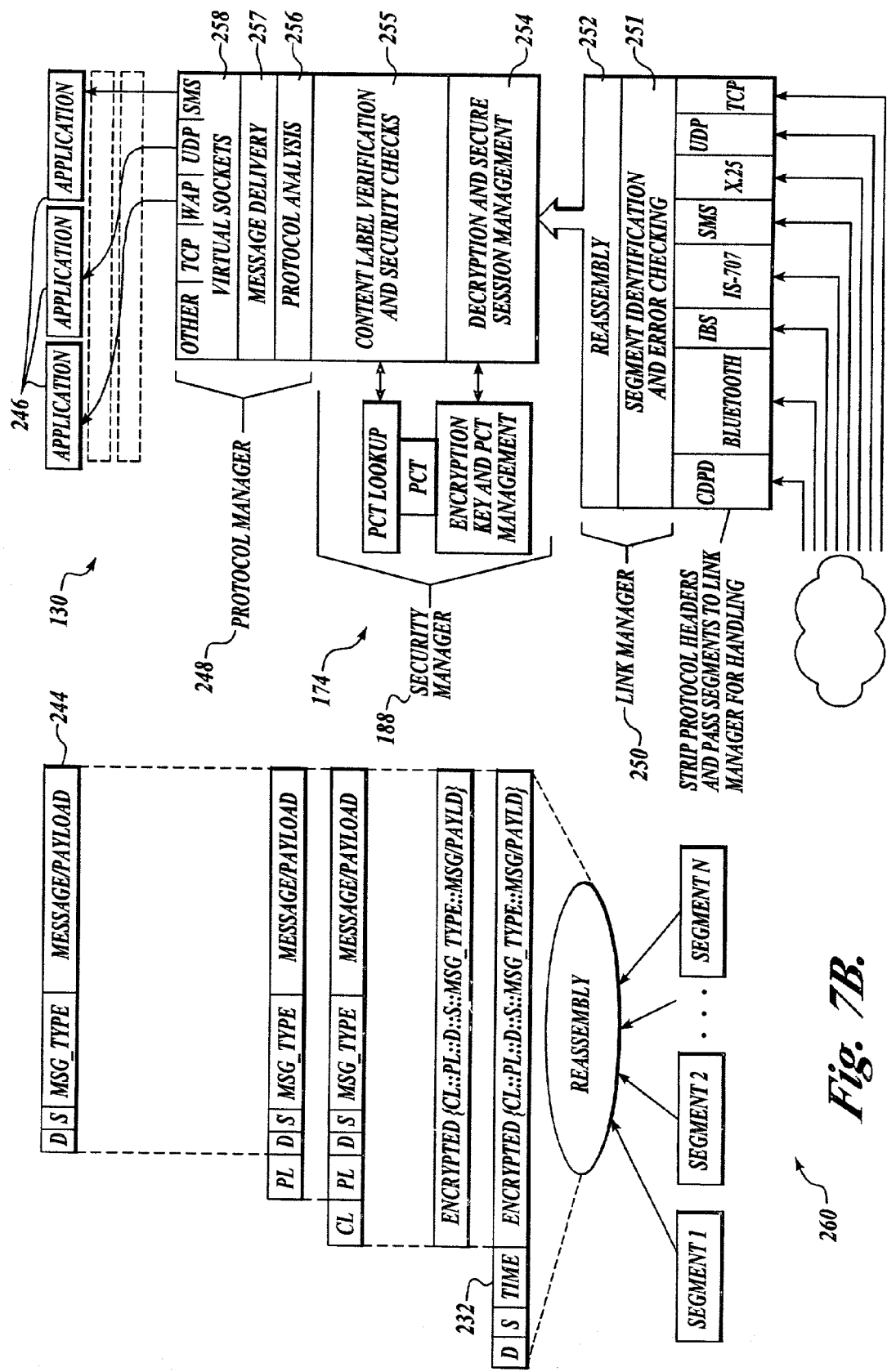

FIG. 7B is a schematic diagram showing software architecture at receiving node 130. The left side of FIG. 7B shows the evolution of received segments 260 of the message 202 transmitted by sending node 120 (FIG. 7A) as they are handled and reassembled to form a received message 244 delivered to one or more receiving node applications 246. With reference to FIG. 7B, receiving node software system 174 includes a receiving node security manager 188, a receiving node protocol manager 248, and a receiving node link manager 250. Protocol manager 248, security manager 188, and link manager 250 perform functions corresponding to protocol manager 156, security manager 158, and blink manager 159 of sending node 120, such as segment identification and error checking 251, reassembly of message segments 252, decryption and secure session management 254, content label verification and security authorization 255, protocol analysis 256, message delivery 257, and virtual sockets 258. Receiving node software system 174 can be implemented with software identical to sending node software system 150 to enable two-way synchronius or asynchrous communication between sending node 150 and receiving node 130.

Upon receipt of message segments 260, reassembly module 252 of link manager 250 uses header information (not shown) of message segments 260 to reassemble message segments 260 into encrypted content labeled message 232'. Segement identification and error checking module 251 of link manager 252 monitors the segment receipt and reassembly process to ensure that segments are not lost or corrupted during transmission. Encrypted content labeled message 232' is then handled by security manager for decryption and content label verification to ensure that the unencrypted message 244 delivered to applications 246 is of a message type size and source application authorized for delivery to the designated receiving node application 246 identified in the message header.

Figure 7C:
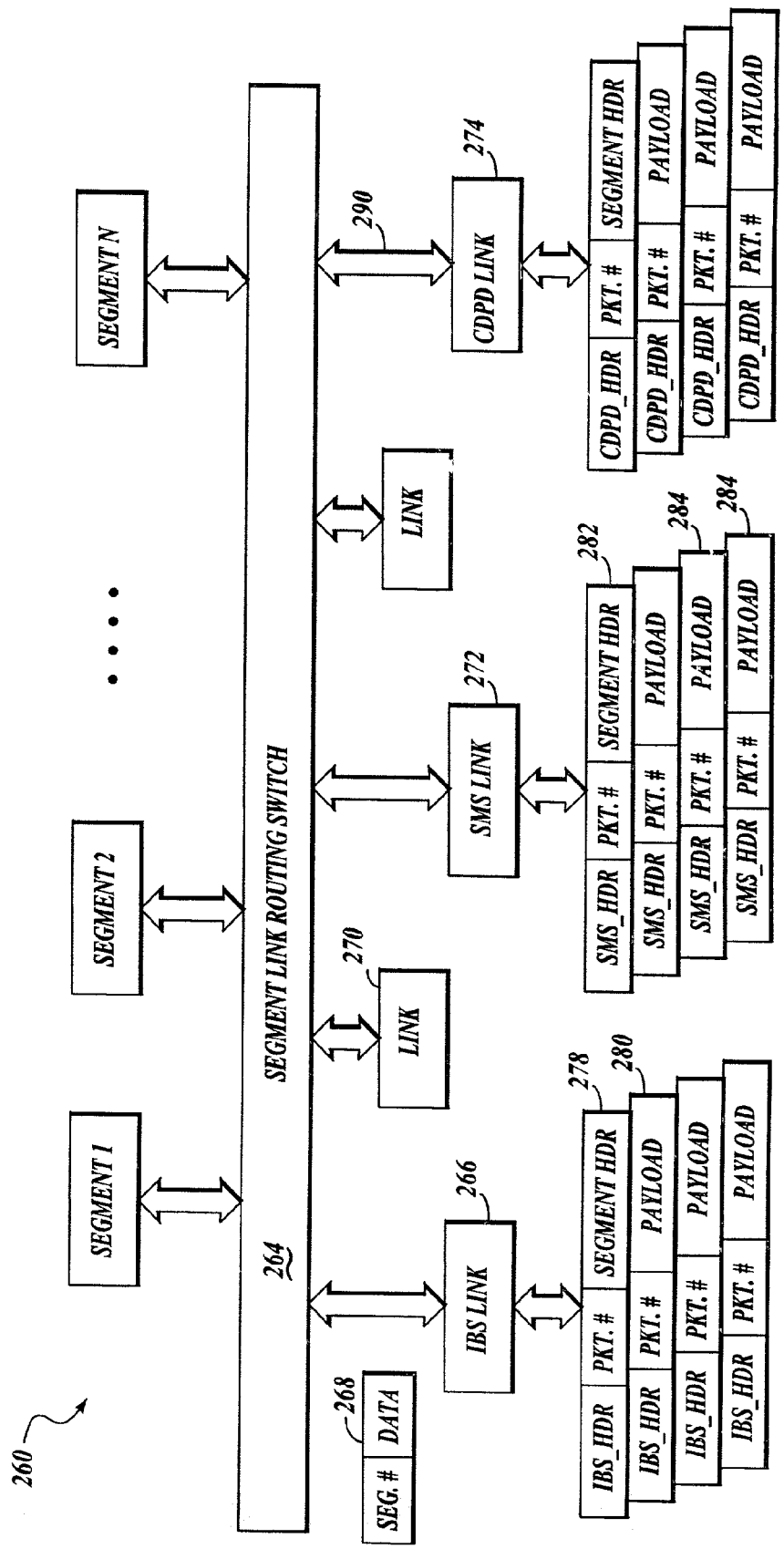
FIG. 7C is a schematic diagram illustrating operation of a link manager of the system software of FIG. 6 and its interface with network link controllers.

FIG. 7C illustrates operation of the link manager component and its interface with the link controllers. First, logic in the link manager can segment a message into any number of segments, based on the communication links available, latency or queue size of each link, and the link choose parameters mentioned earlier such as priority, message size, and message type. Segmenting a message over two or more communication links has the potential for increased bandwidth as well as enhanced security. The link manager then directs each segment to a selected link. For example, as illustrated in FIG. 7C, the link manager can employ a segment link routing switch 264, which may be implemented in software and/or hardware. The link manager may direct a first segment to an IBS link 266. "IBS" refers to in band signaling, a technique for transmitting data at a low data rate within the voice channel of a wireless telephone communication link. Other links, for example, link 270, may be unavailable at the present time, or the link manager may determine that link 270 is inappropriate for the present message. Another segment may be routed by the link manager to an SMS link 272, referring here to the short message service provided by some wireless carriers. When the link manager routes a segment of data to a selected link, it appends a segment number to the data as shown at 268. In FIG. 7C, a third segment is routed to a CDPD link 274. Each of the link controllers 266, 272, 274, etc. may include a buffer and attends to the transmission tasks generally associated with the transport and network layers of the OSI model. Each data segment is treated by the link controller as a complete message. That message typically will be further partitioned into packets for transmission over the data link and physical layers. Thus, the LBS link controller 266 can partition the assigned segment into a plurality of packets, for example, packet 278. Each packet includes at least a header, packet number, and payload. The header is specific to the corresponding link type. So, for example, the header of packet 278 generated by the IBS link 266 is an IBS type of header.

The IBS link can also add a segment header as the payload in packet 278. The segment header includes information for reassembling the segments at the receiving node.

Similarly, the SMS link manager 272 generates a series of packets beginning with packet 282, and continuing with a series of payload packets indicated at 284. These specific headers, labels and protocols are not critical, and can be varied within the scope of the general functionality of the present invention. The interface between the link manager software and the various individual link controllers, illustrated for example, at 290, includes status as well as data aspects. For example, the link controller reports to the link manager its availability, latency or queue size, and status of the requested transmission. This information is taken into account by the link manager in its decision making.

As indicated in FIG. 7B, the various segments of the transmitted message will be reassembled at the receiving node. The process is largely an "undoing" of the segmentation process undertaken at the sending node. Briefly, each communication link receives a series of packets which that link can then reassemble into a complete segment, optionally employing error checking and correction as are known in the art. Each link controller forwards the received segment, including the segment identification information (see 268) to the segment link routing switch 264. Based on the segment identifiers, the link manager logic controls the link routing switch to reassemble the complete message as indicated generally in the reassembly step in FIG. 7B.

As indicated in FIG. 7B, the various segments of the transmitted message will be reassembled at the receiving node. The process is largely an "undoing" of the segmentation process undertaken at the sending node. Briefly, each communication link receives a series of packets that link can then reassemble into a complete segment, optionally employing error checking and correction as are known in the art. Each link controller forwards the received segment, including the segment identification information (see 268) to the segment link routing switch 264. Based on the segment identifiers, the link manager logic controls the link routing switch to reassemble the complete message as indicated generally in the reassembly step in FIG. 7B.

Figure 8:
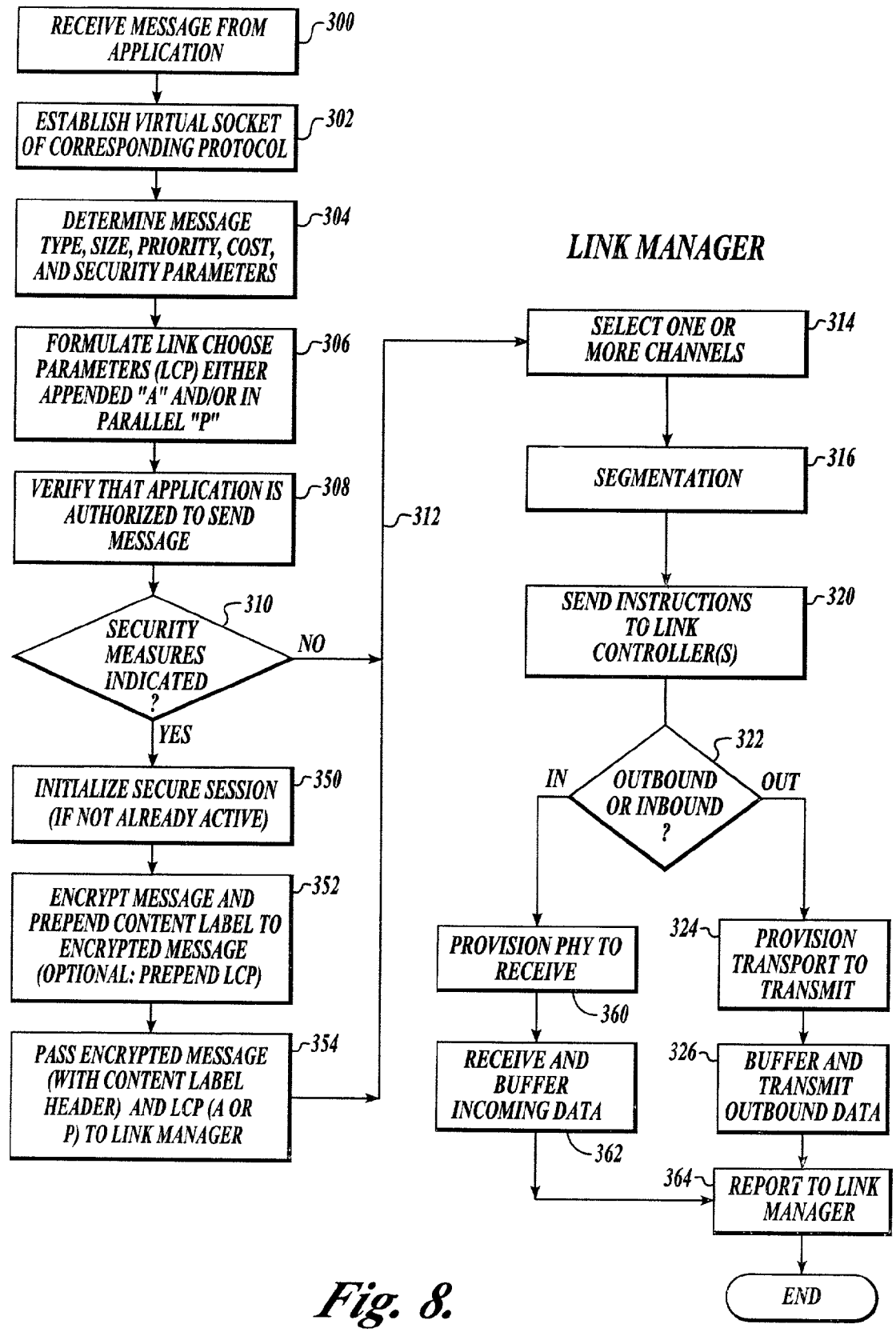
FIG. 8 is a flowchart showing the steps performed by the system software of FIG. 1 operating on a sending node, as depicted in FIGS. 7A, 7B and 7C.

Again referring to FIG. 8, the next step 304 calls for determining the message type, size, priority, cost sensitivity, and security parameters, some or all of which may be used in connection with the security methods of the present invention as well as link choose logic implemented in the link manager. These characteristics or meta data do not require reading the actual message content or payload. In step 306, the system software formulate link choose parameters (LCP) based on the information acquired in step 304. The link choose parameters, LCP, can be passed down to the link manager component in various ways. For example, it can be appended to a message packet, or the LCP information can be passed to the link manager along separate signal path(s). The former method is indicated by the letter "A" as being appended, while the latter is indicated by a "P" indicating the information moves in parallel with the present message. Other techniques for passing this information to the link manager component will be known to those skilled in the software art, such as shared memory, assigned registers, and/or various software messaging techniques.

The next step 308 is for the system software to verify that the application sending the message is in fact authorized to send this particular type of message. This process is based upon a dynamic message privilege control table (PCT) described in detail later with reference to FIG. 14B. In step 310, the system software determines whether or not security measures are indicated. If not, control passes directly via 312 to the link manager software. The link manager at step 314 selects one or more channels or links for transmission of the message, as explained in greater detail below. The link manager may choose to partition or segment the message into multiple segments, each of which will be transmitted over a corresponding link. The link manager controls the link controllers, step 320, accordingly. In the case of an outbound message, as determined by decision 322, the link manager provisions the transport layer, step 324, for transmitting the message. A link controller (see FIG. 14) handles buffering and transmitting the outbound data, step 326, and then reports to the processor, either confirming transmission or flagging an error to initiate retransmission. Again, although these steps are illustrated serially in FIG. 8, the link manager can partition a message into multiple segments and send them in parallel over multiple communication links. This process is explained in greater detail with reference to FIGS. 7A, 7B and 7C.

Referring again to decision 310, if security measures are indicated for a given message, the security manager initializes a secure communication session, if one is not already active, step 350. This session is used to exchange information related to generating encryption keys. The security manager then encrypts the subject message, step 352, and attaches a content label to the encrypted message. It can also attach link choose parameters mentioned above. The encrypted message with a content label is passed to the link manager, step 354. As mentioned earlier, the link choose parameter information can be passed to the link manager either as a label appended to the message through alternative messaging to the link manager component.

In some cases, the link manager is called upon to configure a communication link for receiving a message. In this case, for an inbound message, the link manager provisions the corresponding link controller to receive a message, step 360, the corresponding link controller will then receive and buffer incoming data, step 362, and then report to the link manager, step 364. Again, the link controller may confirm receipt of a message, or flag an error to initiate retransmission.

Figure 9:
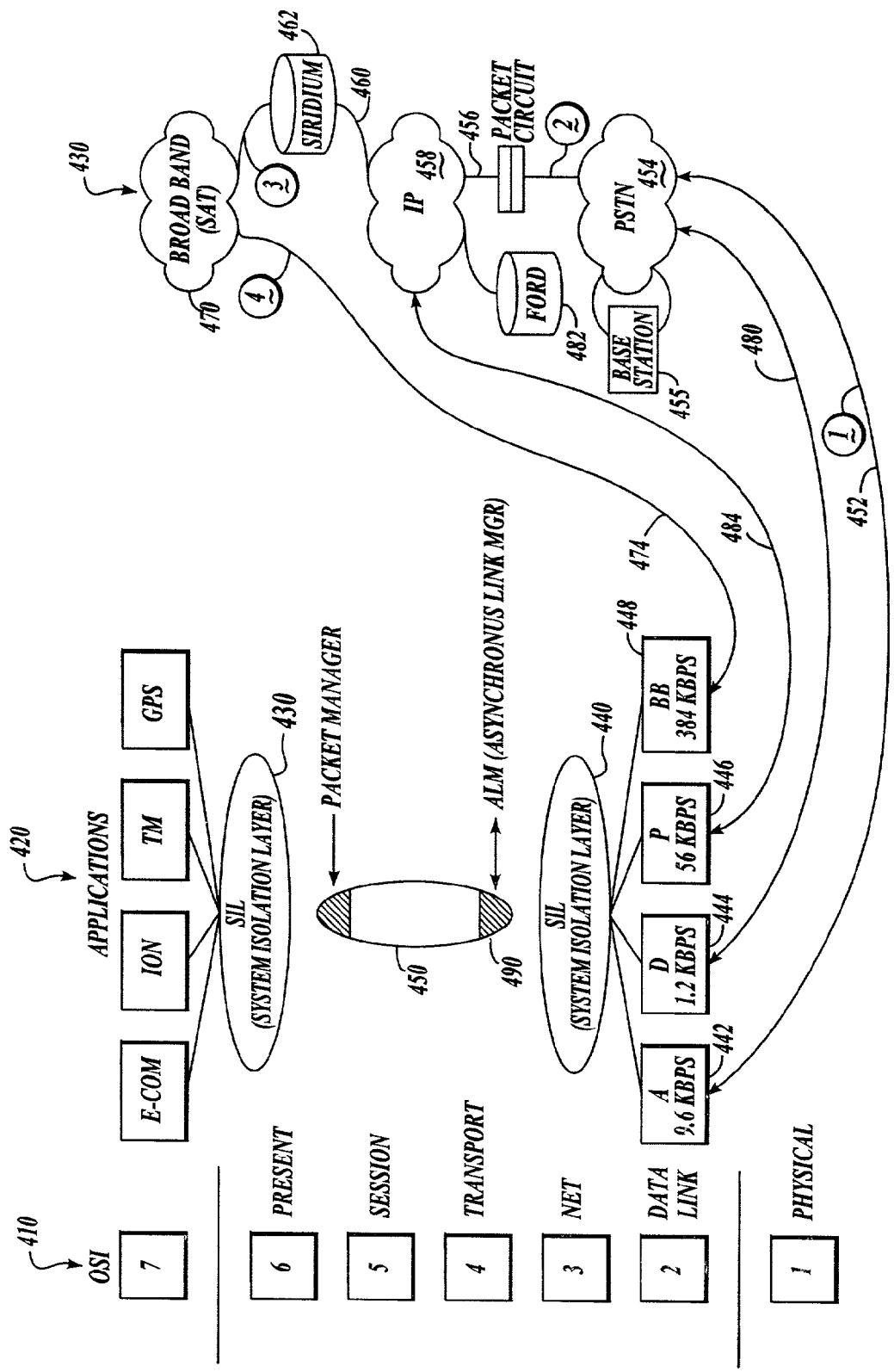
FIG. 9 is a conceptual diagram of the system software and secure dynamic link allocation system of FIG. 6 shown, with reference to the Open Systems Interconnect model ("OSI model"), being implemented for loosely coupled networking over various physical network links in accordance with the present invention.

FIG. 9 is a conceptual diagram illustrating several aspects of the present invention. The left-side of the diagram refers to the seven layers of the OSI (open system interconnection) model. This is an ISO standard for worldwide communications that defines a framework for implementing protocols in seven layers. According to the OSI model, control is passed from one layer to the next, starting at the application layer in one station, proceeding to the bottom layer, over the channel to the next station and back up the hierarchy. Most of this functionality exists in all communication networks. The present invention departs from the classical OSI model in several respects as will be discussed. In the classic model, layer one is the physical layer, corresponding to a wire or cable in a wire network, and corresponding to a wireless channel in a wireless context. Layer 2 is the data link layer which generally is responsible for transmitting data from node to node. Layer 3, the network layer, routes data to different networks. Layer 4, the transport layer, generally insures delivery of a complete message. Thus it is charged with segmentation and reassembly of packets to form messages. Accordingly, the transport layer may need to track down any missing messages. Layer 5, the session layer, in general starts, stops and governs transmission order. Layer 6, the presentation layer, implements syntax for data conversion, and finally, layer 7 is the well-known application layer. As illustrated in FIG. 9, by way of example, applications can include e-commerce, GPS location services, telematics, voice communication, etc.

For the middle portion of FIG. 9, this conceptual diagram illustrates a first system isolation layer 430 just below the applications. A second isolation layer 440 is shown just above the OSI data link layer 2. At the data link level, FIG. 9 illustrates an analog modem (9.6 kbps) 442, a digital modem (1.2 kbps) 444, a packet modem (56 kbps) 446 and a broadband modem (384 kbps) 448. These channels are merely illustrative and other types of wireless links can be employed. It is expected that wireless data communication technologies will continue to evolve. One of the important benefits of the present system is that new links can be deployed without changing other aspects of the system, as further explained later, because of the system isolation layers. Similarly, at the top of the diagram, new applications can be deployed without changing the operating system software, generally indicated at 450, because it is logically isolated from the application layer, as well. The right-side of FIG. 9 illustrates, generally 430, some examples of application of the present system to form loosely coupled, ad hoc networks for communications. The term ad hoc is used here to refer to building a network loop, segment by segment, each segment comprising a separate communications. This ad hoc loop is formed as necessary and taken down when its task is completed. It is "loosely coupled" in the sense that multiple, distinct communications segments are involved in forming the loop. Each segment of the ad hoc loop comprises one or more communications sessions which, although inspired by receipt of a message from a preceding segment, comprise a distinct communication rather than a mere retransmission or routing of that preceding message.

FIG. 9 illustrates some examples of "loosely coupled," ad hoc networking as follows. A first communication traverses a first link 462 using the analog modem link for 442 to reach the public switched telephone network (PSTN) 454. This segment would typically traverse a wireless bay station and wireless switching network (not shown). A "call taker" sender or bay station coupled to the PSTN (and not shown) can include a gateway for access to the Internet over a packet circuit 456. Thus, the bay station can initiate a second communication, or segment or our loosely coupled network, in response to the first communication via link 452. The second communication traverses the Internet 458 to a selected information server site over a link 460 (most likely a land line wired link). In this illustration, the information service provider called Siridium operates a server 462 for this purpose. Siridium, in turn, operates or contracts with a satellite-based or satellite-born broadband broadcasting system 470. The Siridium server 462, optionally after arranging for payment by the user, sends a message to the broadband satellite system 470. It may be necessary for the Siridium system to acquire requested data from another source (not shown). For example, the operator of our mobile system may have sent a request to download the potentially classic movie Top Gun. The Siridium server system 462 would acquire the movie content in digital form and transmit it (uplink) to the satellite system 470. The satellite system, in turn, broadcasts the video data indicated by link 474 to the requesting mobile unit, where it is received at the broadband receiver link 448. This last segment completes the loop of the ad hoc loosely coupled network. The onboard communication system then sends a message acknowledging receipt (or noting a problem), again via the analog modem 442. This message traverses segment 452, via the wireless and PSTN networks to the bay station 455. The bay station initiates a corresponding message, in response to the acknowledgment, and sends that message via link 456 through the Internet to the Siridium system 462. That system now posts the billing charge for the movie, if it was received successfully, or initiates rebroadcast of the movie if necessary.

FIG. 9 further illustrates another example in which an initial message might be sent over a digital modem 444 at 1.2 kbps, again via the PSTN 454. This message might be a request for nearby shopping or restaurant information, in other words, valet services. Which link is used to send this initial request is a matter of link choose logic further explained below. The valet services request on link 480 is received at the bay station 455. As before, the bay station initiates a second message, this time via the Internet (or via a land line crawl) to a selected information server, which in this example, might be provided by Ford Motor Company, in the form of a Ford valet server 482. In this case, the Ford server might respond by sending a HTML page comprising the requested information for display to the mobile user. The HTML page data can be transmitted back to the mobile unit, not in the same session as the initial request message, but in a separate communication session over a higher speed link, for example, link 484 which is received by a 56 kbps packet modem 446. This enables faster transmission of the HTML page content. If the packet modem link 446 corresponds, for example, to the link controller 560 on FIG. 10, that link controller may write the HTML data to RAM 524 via the communication bus 502, but in any event, the data can be transferred via the car bus adapter bridge 510 for display to the user via a dashboard display system 514. On the other hand, referring again to FIG. 9, if the communication system is merely sending routine operating data to Ford, it may choose to use the digital modem link 480 and the Ford system might acknowledge receipt of such data by a simple message over the control channel of a cell phone link. The selection of a link for outgoing messages is one of the functions of the asynchronous link manager (ALM) 490 described in greater detail later.

Figure 10:
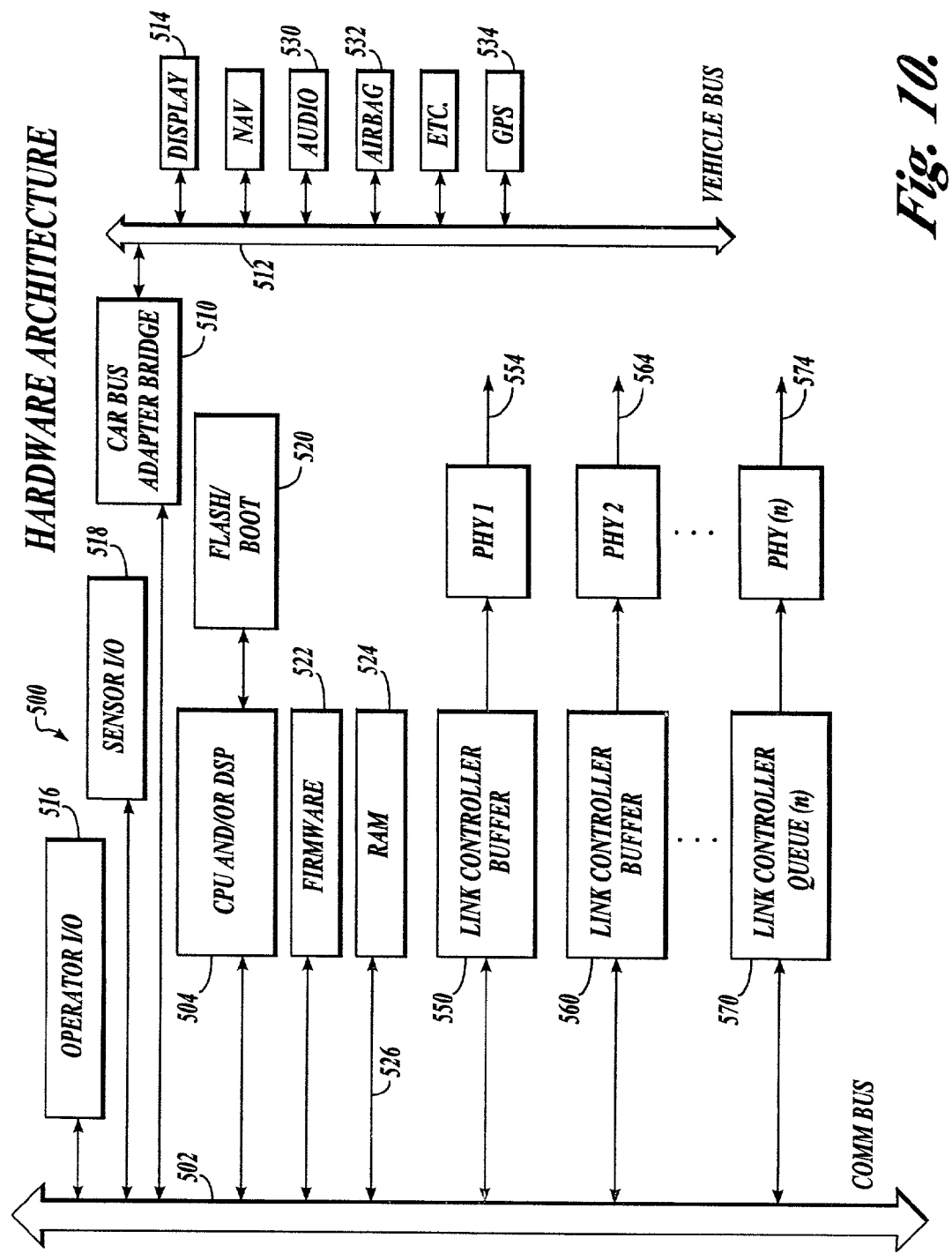
FIG. 10 is a simplified block diagram showing a hardware architecture of a mobile communication node for implementing the secure dynamic link allocation system of FIG. 6 in a motor vehicle, in accordance with a preferred embodiment the present invention.

FIG. 10 is a simplified block diagram of a hardware architecture for implementing a communications system in accordance with the present invention in the context of a motor vehicle. In FIG. 10, the communications system 500 can be implemented in a wide variety of hardware architectures. By way of example only, FIG. 10 illustrates use of a communications bus 502 for carrying both address and data information as is typical of many microprocessor-based systems. This system includes a CPU and/or a DSP (digital signal processor) 504 coupled to the bus 502 for carrying out the operations described herein. More specifically, the processor 504 executes software which can be stored in a flash memory 520 or in a firmware memory 522 coupled to the bus 502. The flash memory 520 can include boot software for initializing the processor and can be used to store temporary variables in a nonvolatile manner. For example, the flash memory can be used to store encryption keys, "message of the day" and other messages related to security as described herein. A privileged control table can be stored in flash memory or downloaded as described elsewhere. Communication system 500 also includes random access memory 524 coupled via memory bus 526 to the communication bus 502 for temporary storage of data as necessary. For example, the RAM memory can be used for processing data packets, including encapsulating packets and extracting information from headers and other packet fields.

System 500 further includes an operator interface module 516 which can be used for interacting with an operator through keyboard, visual display, hands-free audio channel, etc. Alternatively, the communications system 500 can interact with the operator through the vehicle's existing driver interface systems. In such an embodiment, interactions with the user related to communications are transferred via a car-bus adapter bridge 510 to the vehicle bus 512. The adapter bridge 510 provides both electrical and logical transformations as necessary for communication between the communication bus and the vehicle bus. This enables the communication system to, for example, display messages to the operator via the dashboard display system 514 coupled to the vehicle bus 512. The adapter bridge 510 is also useful for coupling the communication system to the vehicle audio subsystem 530. Other vehicle subsystem such as the air bag system 532 and GPS system 534 are shown by way of example.

As one example of an interaction between a communications system 500 and other on-board vehicle systems, the communications system 500 can be used to download audio program content as described in greater detail below. As the audio content is received, decrypted, decoded, etc., the actual payload or audio data can be accumulated in RAM 524. The CPU 504 then transfers the audio content from RAM 524 via the communication bus 502 and the car bus adapter bridge 510 to the audio system 530 where it can be played on demand. Audio system 530 may in turn have its own memory system where the audio content can be stored for reuse at a later time without involving the communications system 500. Conversely, going the other direction, the vehicle audio system 530 in conjunction with the display system 514 can be used by an operator to input a request to download particular audio or video content to the vehicle. These instructions pass from the vehicle bus 512 via the adapter bridge 510 to the processor 504 for execution by the communications system. The communications system works interactively with the other on-board vehicle systems not only for entertainment, but to implement both transmission and receipt of critical data such as a 911 emergency message, as explained later.

Continuing an overview of the hardware architecture, the communications system 500 further includes a plurality of link controller modules, e.g., link controllers 550, 560 and 570. Each link controller controls operation of a corresponding communication link such as a analog modem link, a conventional cell phone link, a CDPD link, etc. Each of the link controllers is coupled to the communication bus 502 for interaction with the CPU 504 and RAM 524. Particularly for high-speed operation, such as a broadband download, the corresponding link controller may include buffer memory circuits, and hardware circuits for high-speed error-checking, error-correction and the like. Each link controller is coupled to a corresponding transceiver type of interface for connection to the physical layer, in this case a corresponding antennae. So, for example, link controller 550 is coupled to "PHY1" which may be an analog modem. PHY1, in turn, is connected to an antennae 554 similarly, link controller 560 is connected to PHY2, which in turn is connected to a second antennae 564. Each antennae preferably is an appropriate size and design for the frequencies applicable to the corresponding communication link. At least one link controller, say 570, can be connected through a corresponding physical interface to a conformal antennae 574. This refers to an antennae or antennae array that conforms to the shape of a portion of a vehicle such as the roofline, hood or spoiler, so that the antennae can be mounted adjacent or invisibly embedded within the corresponding vehicle body part. The CPU maintains multiple pointers into RAM memory 54 to accommodate simultaneous transfers of data (including headers, labels and payload) over multiple links. Each link controller provides status information to the CPU, for example, latency information or buffer size, which can be used to compute latency, for this operative to take into account in selecting a communication link. The link controller also indicates whether the corresponding link is currently available at all, which again must be taken into account in assigning communication links. Importantly, the present architecture or any functionally similar architecture can be used to "spread" a communication over a multiple simultaneous links. This should not be confused with spread spectrum transmission which is a commonly used technique for spreading data over multiple frequencies, such as in the widely used CDMA cell phone system. While spread spectrum spreads a signal over multiple frequencies, the signals nonetheless represent a single logical channel. For example, CDMA provides a one of 64 channeled coding for each frequency set. The present invention provides for spreading a given communication over two or more distinct communications links, each of which may employ different frequencies and/or different transfer rates.

Figure 11:
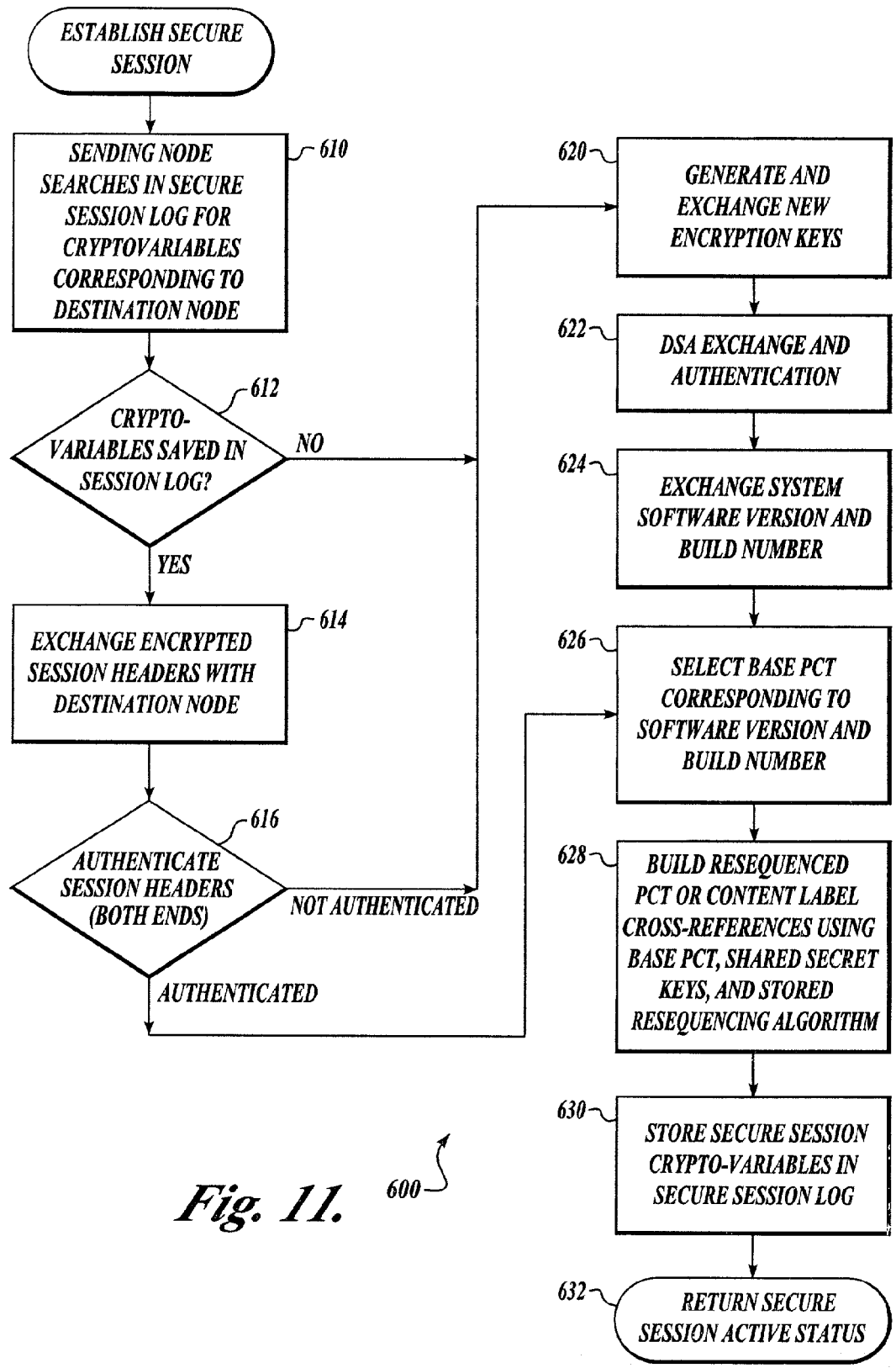
FIG. 11 is a flowchart depicting the steps performed in establishing a secure communication session between the mobile node of FIG. 10 and a call center node operating the secure dynamic link allocation system of FIG. 6.

FIG. 11 is a flow chart depicting steps performed in establishing a secure communication session between any two nodes operating the secure dynamic link allocation system of the present invention. For example, secure communication session initialization can occur between a mobile node operating on a motor vehicle and a call center node operated by a service provider such as an auto club, an automobile manufacturer, dealership, Internet service provider, or another mobile node. With reference to FIG. 11, the security manager 158 (FIG. 6) first searches in a secure session log for the presence of encrypted variables corresponding to the destination identified in message 202 (FIG. 7A). (Step 610). If an entry exists in the secure session log, then sending node initiates an exchange of an encrypted session header stored in the secure session log (step 614) to verify and reestablish an active session represented by the encrypted section headers.

If encryptive variables are not saved in the secure session log or the encrypted session headers are not authenticated by both parties to the communication, then the security manager proceeds to initialize a new secure session beginning with the generation and exchange of new encryption keys (step 620). Encryption key exchange and generation of share of private keys is preferably formed using a shared private key generation algorithm, such as Diffie-Hellman, which uses public keys exchanged by both parties and an algorithm to generate a secret key common to both nodes that is based on both the exchange public keys and reserved private keys corresponding to each party's public key. Both nodes then exchange digital signature algorithm messages and authenticate each other's messages 622 to verify the identity of the other node. Next, the node exchange software version and build number information 624, which is used by the nodes to determine a base PCT known to both nodes. For example, if a first node is operating system software version 5.2 and a second node is operating system software version 5.1, but both nodes have a stored PCT corresponding to system software version 5.0, the system security manager will negotiate this common version level and use the base PCT corresponding to that version level (and build number if appropriate). In the event where encryptive variables are stored in session log are exchanged between the nodes 614 and authenticated 616, the steps of key exchange and secret key generation 620, digital signature algorithm message exchange and authentication 622, and system software version and build number exchange 624 are bypassed.

Regardless whether a new secure session is being established, or a preexisting secured session is being reauthenticated, a base PCT is identified 626 and resequenced 628 so that content labels corresponding to the PCT entries are reordered or scrambled to avoid interception and spoofing of the content labeling and verification functions described above. To resequence the base PCT, the security manager uses the generated shared secret key in combination with a private resequencing algorithm defined in the system software version to generate reordering information that can be stored in a separate lookup table or resequencing function (step 628). Finally, the security manager completes initialization of secure session by storing the encrypted variables, digital signature, algorithm messages, and other session information in a secure session log that may be encrypted and made accessible only to security manager (step 630). Upon completion of secure session initialization and storage of encrypted variables, the software returns a secure session active status to security manager indicating readiness for encryption and transmission of messages.

Figure 12:
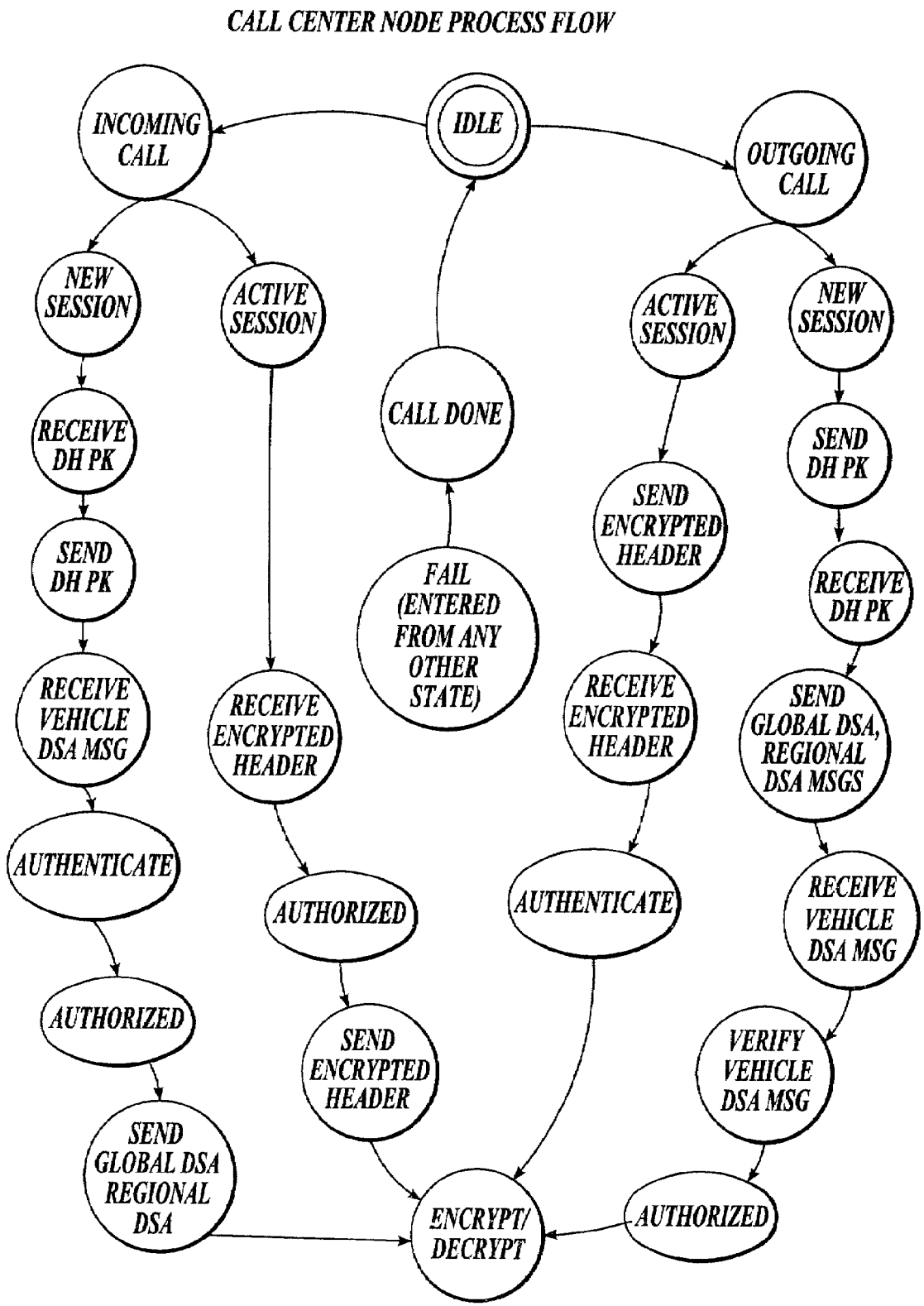
FIG. 12 is a flowchart depicting the steps of an encryption key exchange and digital signature authentication at the call center node of FIG. 11.
Figure 13:
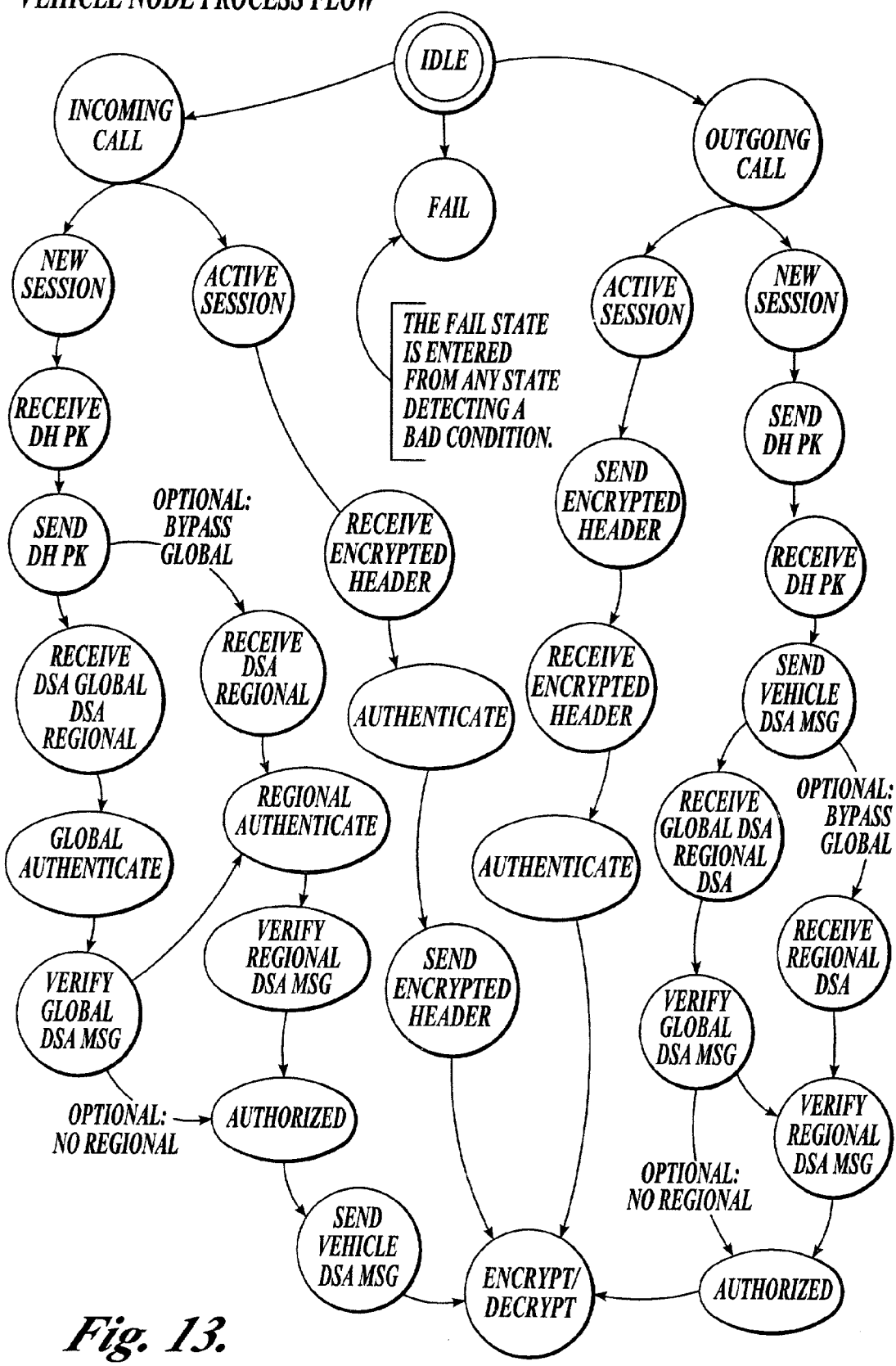
FIG. 13 is a flowchart depicting the steps of an encryption key exchange and digital signature authentication at a mobile node in accordance with the method depicted in FIG. 6.

FIGS. 12 and 13 are flow charts depicting the steps of encryption key exchange 620 and digital signature authentication (DSA) 622 at respective call center and vehicle nodes, in accordance with secure session initialization procedure 600 of FIG. 11. With reference to FIG. 12, upon receipt of an incoming call, the call center checks to determine whether the incoming call is a continuation of an active session with a known caller through receipt and authorization and response with encrypted secure headers prior to beginning encryption and decryption of messages. If an incoming call is not a continuation of an active session, a new session is established by exchange of Diffie-Hellman public keys (DH PK) and exchange and authentication of digital signature algorithm messages (DSA Msg), possibly including global and regional DSA messages relating to the region and domain served by the call center. If the call is an outgoing call generated by the call center an active session can be established by exchange of encrypted session headers and authentication by both the call center and vehicle site nodes prior to encrypted message transmission. Otherwise, a new session is established by exchange of Diffie-Hellman public keys (DH PK) exchange of DSA messages and verification. Content labeling resequencing is not depicted in FIG. 12, but would be performed prior to beginning encryption and decryption. As FIGS. 11 and 12 illustrate, the encryption, digital signature algorithm, content labeling and verification, and other security functions implement can be implemented in a modular fashion in security manager to progressively enhance security features of the secure dynamic link allocation system in accordance with the present invention. This architecture is particularly advantageous in the context of mobile devices, which are quickly improving in their data storage and processing capacities as a result of technological improvements.

With reference to FIG. 13, the vehicle node security manager handles incoming and outgoing calls in a manner similar to call center node (FIG. 12). Optional bypass procedures are provided for handling the presence or absence of regional and global DSA messages for digital signature authentication of the call center, depending upon availability of call center DSA messages.

With reference to FIGS. 12 and 13, a fail state of the key exchange and authentication procedure is entered from any other state detecting a failure condition such as, for example, failure to receive an encryption key or digital signature message at any state during the key exchange and authentication process. Failure of the key exchange authentication process requires the nodes to restart the secure session and initialization process.

FIG. 14 is an example of a privilege control table (PCT) of a mobile node such as a vehicle for incoming messages received at the mobile node. FIG. 14B is a PCT for the mobile vehicle node for selected outgoing messages authorized for secure transmission from mobile node. FIG. 14C is an example of an outgoing message PCT stored at a call center node at an auto club call center. It will be understood that PCTs of FIGS. 14A, 14B, and 14C are exemplary only and are not intended to be comprehensive or limiting in nature.

With reference to FIG. 14A, mobile node incoming PCT includes multiple entries, each entry labeled with a content label such as a sequence of numeric identifiers. Content label, alternatively, could be represented by a memory pointer or other identifier of a record of the mobile node incoming PCT. Each record or entry of incoming PCT includes, in addition to the content label, a source address, a source application, a destination application, a message size, and a minimum security level. For example, content label 4 identifies an authorized Message_Type email having a size between 10 kilobytes and 5 megabytes a minimum security level of "low" that is received from an ISP messaging application and designated for delivery to an email application running in the application layer of the mobile node. Email messages that failed to satisfy all of the conditions identified in the PCT records will be denied delivery to the destination application and a message rejection reply will be sent to the source application by the security manager. For example, if the message size of the email is greater or less than the authorized message size, the verification procedures rejects the message to avoid delivery and execution of harmful messages on vehicle node. Content label provides an added layer of security (in addition to encryption and digital signature authentication) to thwart attacks attempt to spoof the mobile node's security manager into believing that the message is of a type listed in the PCT. Upon verification of content label, security manager determines a resequenced content label as described in FIG. 11 based on the base PCT content labels (FIG. 14A) and a stored algorithm of security manager that uses the shared private key. Preferably, the reordering algorithm is different from other security algorithms implemented by the vehicle node so that an attacker who has cracked the other security modules of the system does not have direct access to the reordering algorithm.

Various security levels (including a nonapplicable or "off" security level (not shown)) can be established in PCT and are used by the security manager and link manager of the sending node to determine security measures and link selection. By establishing minimum security level in the PCT, the secure dynamic link allocation system of the present invention avoids Trojan horse applications circumventing security measures through direct access to system communication functions, unless authorized by security manager and/or PCT. FIG. 14B is an example of a vehicle outgoing message PCT that includes an entry for an urgency distress message (content label=3) that can be of any message size and that can be transmitted without security measures, so long as the destination address of the emergency distress message is a public safety answering point (PSAP) (also known as a 911 call center), and provided that the source application is an emergency application recognized in PCT. With reference to FIG. 14C, a call center node of an auto club includes an outgoing message privilege control table with entries limited to those functions performed by the call center, such as automobile unlocking and location queries performed for roadside assistance purposes as a service to the vehicle owner and member of the auto club.

To prevent unauthorized access to vehicle, auto club is not provided with PCT information corresponding to functions such as vehicle settings, email, and telephone calling services. However, in the event that PCT entries corresponding to unauthorized functions are inadvertently included in a node's PCT, messaging would still remain unauthorized because an entry of the receiving node's PCT would not correspond to the unauthorized sender's source application and address information.

Figure 15:
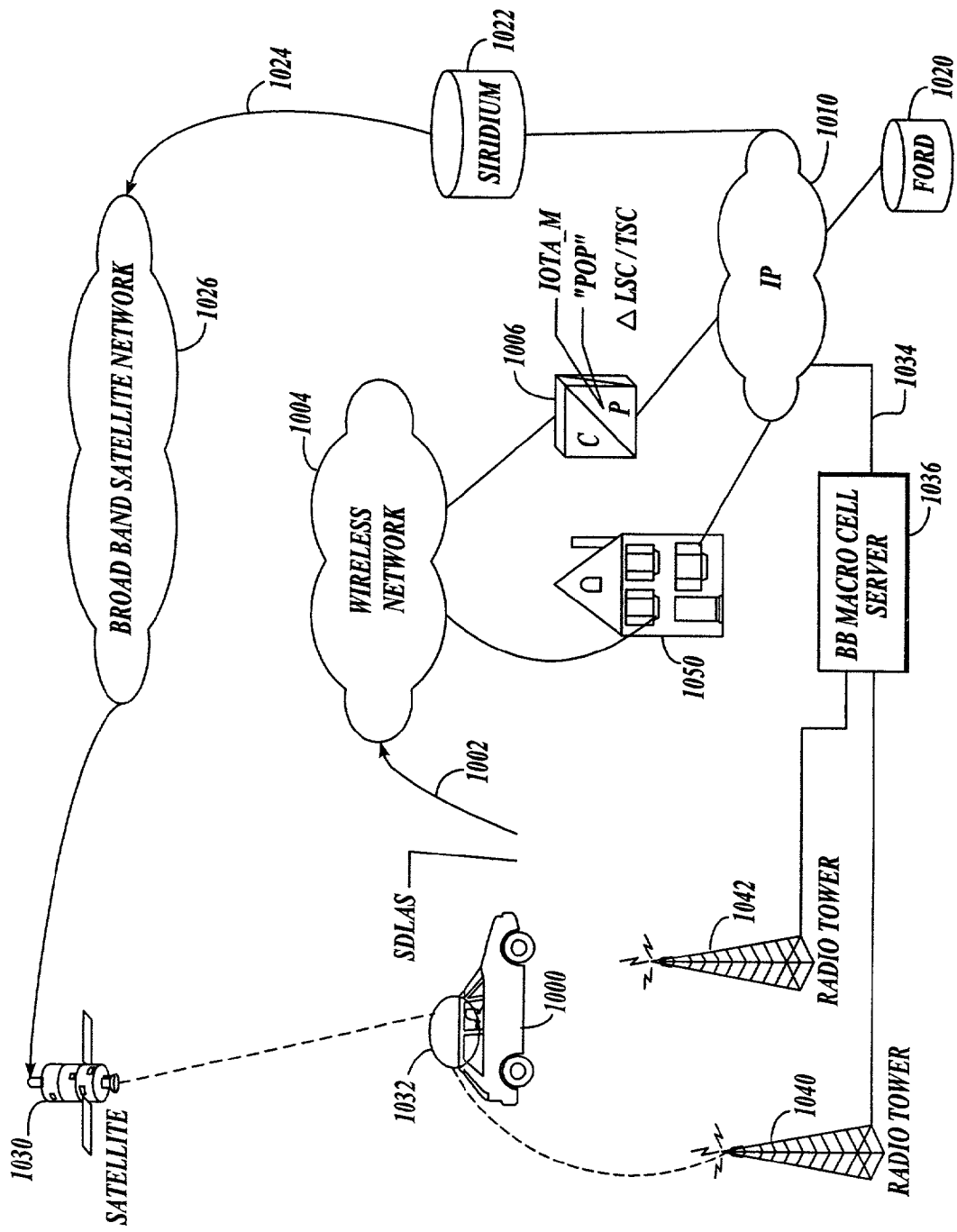
FIG. 15 further illustrates the link allocation and loosely-coupled networking methods of FIGS. 8-10.

FIG. 15 further illustrates the link allocation and loosely coupled networking aspects of the present invention. In this illustration, a mobile unit, such as a car 1000, includes an on-board communication controller that implements a secure data-link allocation system in accordance with the present invention. In operation, the mobile user initiates a request message over a first link 1002 utilizing a low bandwidth channel, such as in-band signaling over a voice channel or digital data-link channel. This message is received by the wireless network, such as a conventional CDMA carrier 1004. The wireless carrier routes the message in accordance with a telephone number to a base station services controller 1006. The base station 1006 need not have a human operator present. It acts as a gateway, receiving request messages from the wireless network and, in response to those messages, creating and transmitting request messages using HTTP, e-mail or other Internet protocol for transfer over the Internet to a corresponding services provider. In this illustration, the provider 1020 is labeled "Ford" to generically represent an automobile manufacturer, although it could be a local dealer or agent, as well. The automobile maker 1020, based on the nature of the request, forwards it to an appropriate services provider. This segment of the loosely coupled network can be carried out over any type of available link. For some applications, a reasonably high bandwidth telephone or wired network connection may be used, or the Internet.

In another application of the present system, the mobile user 1000 sends a request for data or services, including within that request indicia of the present location of the mobile unit. This can be provided by a GPS receiver system deployed in the mobile unit. The location information can be carried as payload in a digital message or embedded in a voice channel over the wireless telephone network. In this case, a base station such as the server 1006 can take the location of the mobile unit into account in determining how to deliver the requested data or services. For example, if the mobile unit has a present location in the vicinity of one or more broadband transmission towers, a request message can be formed and transmitted via 1034 to a broadband macro cell server 1036. The message 1034 is transmitted via the Internet, though it could just as well be conducted over a land line modem or a wide area network. The broadband macro cell server 1036 assembles the requested data and dispatches it for wireless transmission, via a selected transmission tower such as 1040. If the vehicle is moving, subsequent message can be transmitted from the mobile unit to update its location. These updates can be forwarded to the macro cell server which, in turn, can activate additional radio transmission towers such as 1042.

The broadband macro cell may consist of a fixed location where wireless data is to be delivered. For example, a relatively short range broadband wireless transmitter could be used in a drive-through or parking lot arrangement for delivery of movie content. In that scenario, a user would simply drive the to movie store and order a desired movie through the dashboard user interface. A dynamic Internet address, based on location, can be resolved for deliver of the content. Alternatively, as described earlier, a channel code can be delivered directly to the mobile unit over a low speed connection for use in decoding the broadband transmission of content. These are additional examples of the use of loosely coupled networks, typically comprising a plurality of message segments, to achieve improvements in flexibility, efficiency, security and cost. Finally, FIG. 15 illustrates a house 1050 or other fixed location which can be coupled to the wireless network 1004 through the conventional PSTN or to the Internet 1010 through an Internet services provider (not shown), using a conventional DSL or cable connection. As the mobile user's home or office can be included in a variety of communications utilizing aspects of the present invention. For example, a coworker or relative at location 1050 may have no idea of the present location of a mobile user and, therefore, have no knowledge of what communications might be available to the mobile user at the present time. Further, the mobile unit might be at a location where a conventional cell phone service is unavailable. Notwithstanding the unavailability of telephone service, the mobile user can still employ email/Internet messaging through the use of a location-based dynamic IP address as described.

The global positioning system offers any device a unique format and reference point on the planet. No two places on earth have the same location. By calculating the total population of unique addresses in terms of latitude and longitude at a resolution of 0.6 feet (e.g., −122 30.1255,45 28.3478), unique locations of approximately 2.16×1016 can be achieved. Methods are described in commonly-assigned U.S. patent application Ser. No. 09/432,818 filed Nov. 2, 1999, for generating a globally-unique, Internet protocol— (IPv4, IPv6) compatible addressing scheme based on location. With the recent announcements by wireless telecommunications handset providers of the inclusion of GPS receivers in their products, and the deployment of GPS receivers in automobiles, the necessary global position data will be readily available in many mobile units.

More specifically, the prior application describes a paradigm shift in network architecture. The addressing scheme described there is backward compatible with existing networks and protocols, but it leverages them in a new way. Conventionally, mobile devices like a wireless phone or laptop computer were thought of as "clients" in a network architecture, and communications software or "stacks" were arranged accordingly. The clients would communicate with and through a server. Initially, the server or host would assign an IP address to the client. (Typically using DHCP— the Dynamic Host Configuration Protocol.) Then the client could communicate with the rest of the world, through that server, using the assigned address. The server, acting as a gateway, would receive packets from the client, repackage them (encapsulate), and send them onto the broader network. That arrangement is not convenient, and in some situations impossible, for mobile units.

The earlier application upends this conventional arrangement. According to that invention, it is the mobile "client" or end user device that assigns its own IP address, rather than look to a server or host for that function. Thus we define a new DCCP: Dynamic Client Configuration Protocol. The client now acts as a server in that it can communicate directly onto the larger network, even the Internet, reducing the number of intermediate machines. Thus, this newly independent client, having assigned its own IP address (based on global location), can emulate a gateway or router, encapsulating its own packets as it chooses. Addresses are resolved from the client up, rather than from the host down as in prior art. This new paradigm has remarkable potential to traverse the Internet much faster than the prior art systems, driving communication latency and overhead far below present levels.

In the context of the present invention, the modified stack accesses global position data from a GPS application at the session layer. That information is used to form an IP address, which in turn allows communications between the mobile unit and the Internet (i.e., other nodes connected to the Internet), without relying on a wireless carrier acting as an intermediary, and potentially adding to the cost of such access. Instead of exchanging short messages with the wireless carrier, and having the wireless carrier access the Internet to get information for the user, the mobile user is afforded direct access.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A system for communicating information between mobile units, the system comprising:
   a plurality of mobile units, each mobile unit comprising—
      multiple onboard sensors;
   onboard means for processing inputs from the onboard sensors, using data fusion;
   each onboard sensor communicating with the onboard processing means; and
   means for wireless receiving and means for wireless transmitting of information;
   wherein the processing means is in communication with the wireless receiving means and the wireless transmitting means to send information; and
   the onboard processing means comprising means for selecting a path for communicating information, the path including at least communicating information from one of the mobile units to another mobile unit.

2. The system of claim 1 further comprising: using multi-sensor fusion information to establish in real time a unique location of each of at least some of the plurality of mobile units.

3. The system of claim 2, wherein the at least some mobile units receive input information about the real time location of other mobile units in proximity, and wherin the means for selecting a communication path for each of the at least some mobile units uses the received input information to select the information communication path.

4. The system of claim 1, wherein the information comprises diagnostic information about a mobile unit.

5. The system of claim 1, wherein the information comprises information about an environment surrounding a mobile unit.

6. The system of claim 1, wherein at least two of the mobile units each further comprise onboard means for playing an interactive electronic game, the game playing means communicating game information to the onboard means for receiving and transmitting of each of the respective at least two mobile units such that game information exchanged permits playing of an interactive game between parties in the at least two mobile units.

7. The system of claim 1, further comprising means for playing an interactive game, said means generating game information, the game information communicated to a plurality of participating mobile units substantially simultaneously, said communication permitting participation in an interactive game by at least one party in each of the plurality of mobile units.

8. The system of claim 1, wherein the means for receiving and the means for transmitting of a first mobile unit each respectively receive and transmit information from at least one other mobile unit of a series of mobile units, at least one of the series of units in wireless communication with the Internet.

9. The system of claim 8, wherein the information comprises any one or more of electronic mail, images, streaming video, and streaming audio.

10. The system of claim 8, wherein the information comprises information about status of a mobile unit and communication with the internet comprises communication with a call center.

11. The system of claim 8, wherein the information comprises commercial transaction information, the information communicated to a party to the transaction via the Internet.

12. The system of claim 2, further comprising communicating location data for at least some of the mobile units to a call center, the call center having means to analyze location data to produce traffic information.

13. The system of claim 12, wherein the call center further comprises means to communicate to at least some of the mobile units the traffic information about an environment in the vicinity of the at least some mobile units.

14. The system of claim 13, wherein the call center further comprises means to divert movement of mobile units based on traffic information.

15. The system of claim 2, further comprising utilizing information about mobile unit proximity to each other to provide collision avoidance information to mobile units within a closer than predetermined distance from each other.

16. The system of claim 15, wherein the collision avoidance information is timely provided to an occupant of a mobile unit at risk of collision.

17. The system of claim 15, wherein the mobile units comprise automatic collision avoidance controllers receiving collision avoidance information in real time, and a controller of at least one mobile unit at risk initiates evasive action based on the avoidance information.

18. The system of claim 17, wherein a mobile unit at risk communicates risk related information with other mobile units at risk via onboard means for receiving and transmitting of the units.

19. The system of claim 18, wherein the risk related information comprises information analyzed by fusion techniques to confirm risk assessment and identify malfunctioning sensors.

20. A system for traffic control, the system comprising:
a plurality of mobile units, each mobile unit equipped with multiple onboard sensors for detecting traffic environment conditions surrounding the mobile unit each mobile unit equipped with an onboard processor receiving inputs from the sensors, the processor in communication with means for wireless receiving and for means for wireless transmitting of detected information, the processor comprising means for selecting a path for communicating information processed by data fusion between at least one of the mobile units and a traffic communications center, the path comprising using wireless receiving means and wireless transmitting means of at least one other mobile unit.

21. The system of claim 20, further comprising: using multi-sensor fused data to establish in real time a unique location of each of at least some of the plurality of mobile units, in closest proximity to a mobile unit that is communicating or about to communicate information.

22. The system of claim 21, further comprising mobile units receiving input information about the real time location of other mobile units in proximity.

23. The system of claim 21, further comprising communicating location data for at least some of the mobile units from the mobile units through a communications path comprising receiving and transmitting means of other mobile units to a center, the center having means to receive, store and analyze location data to develop traffic condition information.

24. The system of claim 23, wherein the center further comprises means to communicate traffic condition information about an environment surrounding at least some mobile units to the at least some of the mobile units.

25. The system of claim 24, wherein the call center further comprises means to communicate traffic condition information and divert movement of mobile units based on traffic condition information about an environment surrounding said mobile units.

26. The system of 22, further comprising data fusion of real time location information of mobile units in proximity to each other to obtain a better estimate of real time location of each of said units in proximity.

27. A communication system for mobile units comprising:
a plurality of mobile units;
at least one mobile unit containing multiple onboard sensors and an onboard processor;
the processor in communication with the sensors and operable to process inputs from the sensors using data fusion;
the processor also in communication with a wireless receiver and a wireless transmitter;
the processor operable to select a communications pathway based upon predetermined criteria; and
the selected pathway including at least one other mobile unit.

28. The system of claim 27 further comprising the processor calculating unique location data for the mobile unit and transmitting the location data via the pathway to a traffic communications center.

29. The system of claim 28 further comprising the traffic communications center receiving unique location data from multiple mobile units, the traffic communications center using the data to determine traffic conditions, and the traffic communications center transmitting to at least one mobile unit the traffic conditions proximate that mobile unit.

* * * * *

UNITED STATES PATENT AND TRADEMARK OFFICE
CERTIFICATE OF CORRECTION

| | | |
|---|---|---|
| PATENT NO. | : 7,283,904 B2 | Page 1 of 1 |
| APPLICATION NO. | : 09/981660 | |
| DATED | : October 16, 2007 | |
| INVENTOR(S) | : Mitchell A. Benjamin et al. | |

It is certified that error appears in the above-identified patent and that said Letters Patent is hereby corrected as shown below:

On front page, column 1, delete "Related U.S. Application Data".
On front page, column 1, at (63), delete "Continuation-in-part of applicaton No. 09/837,563, filed on Apr. 17, 2001, now abandoned.".
On front page, column 1, at (60), delete "Provisional application No. 60/198,068, filed on Apr. 17, 2000.".

At column 1, line 3, delete "RELATED APPLICATIONS".
At column 1, lines 5-9, delete "This application is a continuation-in-part of, and cliams priority from, prior U.S. application Ser. No. 09/837,563 filed Apr. 17, 2001 now abandoned which in turn claims priority from U.S. provisional application No. 60/198,068 filed Apr. 17, 2000.".

At column 26, line 41, in Claim 3, delete "wherin" and insert -- wherein --, therefor.

At column 27, line 9, in Claim 10, delete "internet" and insert -- Internet --, therefor.

At column 27, line 27, in Claim 15, delete "proximity" and insert -- in proximity --, therefor.

At column 27, line 49, in Claim 20, delete "unit" and insert -- unit, --, therefor.

Signed and Sealed this

Twenty-second Day of December, 2009

David J. Kappos
*Director of the United States Patent and Trademark Office*